US011974011B2

(12) United States Patent
Martin et al.

(10) Patent No.: US 11,974,011 B2
(45) Date of Patent: Apr. 30, 2024

(54) LOCATION RESTRICTED CONTENT STREAMING TO NON-LOCATION AWARE DEVICES

(71) Applicant: Amazon Technologies, Inc., Seattle, WA (US)

(72) Inventors: Paul Martin, Seattle, WA (US); James William Arthur Pearson, London (GB)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/702,667

(22) Filed: Mar. 23, 2022

(65) Prior Publication Data

US 2023/0328311 A1    Oct. 12, 2023

(51) Int. Cl.
*H04N 21/4367*    (2011.01)
*H04N 21/45*    (2011.01)

(52) U.S. Cl.
CPC ..... *H04N 21/4367* (2013.01); *H04N 21/4524* (2013.01)

(58) Field of Classification Search
CPC ................. H04N 21/4367; H04N 21/4524
See application file for complete search history.

(56) References Cited

U.S. PATENT DOCUMENTS

| | | | | |
|---|---|---|---|---|
| 7,509,124 B2* | 3/2009 | O'Neil | ............... | H04N 21/2668 713/168 |
| 7,676,219 B2* | 3/2010 | Williams | ................ | H04L 67/52 380/258 |
| 7,890,087 B2* | 2/2011 | O'Neil | ............. | H04N 21/23439 713/168 |
| 8,081,957 B2* | 12/2011 | O'Neil | ............... | H04N 21/2668 713/168 |
| 8,255,378 B2* | 8/2012 | Ji | ........................... | H04H 60/70 707/706 |
| 8,346,230 B2* | 1/2013 | Goodmon | ............... | G06F 21/10 455/414.3 |

(Continued)

OTHER PUBLICATIONS

International Search Report and Written Opinion dated Jun. 14, 2023, in corresponding International Application No. PCT/US2023/064576, 10 pages.

*Primary Examiner* — Michael B. Pierorazio
(74) *Attorney, Agent, or Firm* — Athorus, PLLC

(57) ABSTRACT

Disclosed are systems and methods to deliver location restricted content to devices that do not have a location component, such as a Global Positioning System component. A location aware device may send to a content delivery service, location information determined by a location component of the location aware device and receive, from the content delivery service, an encrypted access token. The location aware device may then send the access token to a non-location aware device that is on a same local area network as the location aware device. The non-location aware device may provide the access token to the content delivery service along with a request for location restricted content. The content delivery service may use the access token provided by the non-location aware device to verify that the non-location aware device is within a defined area for which the requested location restricted content is allowed for presentation.

20 Claims, 14 Drawing Sheets

(56) References Cited

U.S. PATENT DOCUMENTS

| | | | | |
|---|---|---|---|---|
| 8,370,872 B1* | 2/2013 | Sun | H04N 21/41407 | 725/38 |
| 8,423,004 B2* | 4/2013 | Goodmon | H04L 67/52 | 455/414.3 |
| 8,644,354 B2* | 2/2014 | George | H04M 1/72415 | 725/74 |
| 8,737,990 B2* | 5/2014 | Moreillon | H04N 21/41407 | 455/410 |
| 9,323,916 B1 | 4/2016 | Wu et al. | | |
| 9,832,502 B1* | 11/2017 | Goetz | H04N 21/4524 | |
| 10,735,785 B1* | 8/2020 | Hamrick, Jr. | H04N 21/411 | |
| 10,805,656 B1* | 10/2020 | Jackson | H04N 21/64322 | |
| 2003/0097408 A1* | 5/2003 | Kageyama | H04L 12/1818 | 709/205 |
| 2003/0192054 A1* | 10/2003 | Birks | H04N 21/2343 | 725/100 |
| 2003/0233580 A1* | 12/2003 | Keeler | G06Q 20/382 | 726/29 |
| 2005/0097593 A1* | 5/2005 | Raley | H04N 21/44224 | 348/E7.069 |
| 2006/0031889 A1* | 2/2006 | Bennett | H04N 21/41265 | 348/E7.071 |
| 2006/0059096 A1 | 3/2006 | Dublish et al. | | |
| 2006/0064734 A1* | 3/2006 | Ma | H04N 21/812 | 725/136 |
| 2006/0253560 A1* | 11/2006 | Aaltonen | H04H 60/06 | 709/223 |
| 2007/0067807 A1* | 3/2007 | O'Neil | H04N 21/23439 | 348/E7.071 |
| 2007/0067817 A1* | 3/2007 | Hamilton | H04N 21/6334 | 348/E7.075 |
| 2007/0107022 A1* | 5/2007 | Lawrence, III | H04N 21/44222 | 725/86 |
| 2007/0157234 A1* | 7/2007 | Walker | H04N 21/4621 | 725/38 |
| 2007/0237330 A1* | 10/2007 | Srivastava | H04N 21/6408 | 348/E7.071 |
| 2007/0240192 A1* | 10/2007 | Acharya | H04N 21/6408 | 348/E7.071 |
| 2008/0005770 A1* | 1/2008 | Acharya | H04N 21/6587 | 348/E7.071 |
| 2008/0060035 A1* | 3/2008 | Tsang | H04N 21/222 | 725/109 |
| 2008/0114880 A1* | 5/2008 | Jogand-Coulomb | H04L 61/30 | 709/227 |
| 2008/0184326 A1* | 7/2008 | Nakajima | H04N 5/782 | 725/38 |
| 2008/0201225 A1* | 8/2008 | Maharajh | H04N 21/6112 | 707/999.102 |
| 2008/0216107 A1* | 9/2008 | Downey | H04N 21/812 | 725/25 |
| 2008/0235733 A1* | 9/2008 | Heie | H04N 21/482 | 725/46 |
| 2008/0270725 A1* | 10/2008 | Roden | H04N 21/4335 | 711/E12.001 |
| 2008/0307478 A1* | 12/2008 | Kim | H04L 65/611 | 725/114 |
| 2009/0113489 A1* | 4/2009 | O'Neil | H04N 21/41407 | 725/62 |
| 2010/0180305 A1* | 7/2010 | Migos | H04N 21/4623 | 345/173 |
| 2010/0199316 A1* | 8/2010 | Clarniello | H04W 12/08 | 725/62 |
| 2010/0296487 A1* | 11/2010 | Karaoguz | H04W 36/04 | 370/332 |
| 2010/0299264 A1* | 11/2010 | Berger | G06Q 30/0601 | 705/59 |
| 2011/0086619 A1* | 4/2011 | George | H04M 1/72415 | 455/414.1 |
| 2011/0099587 A1* | 4/2011 | O'Neil | H04N 21/25825 | 725/62 |
| 2011/0119595 A1* | 5/2011 | Bydeley | H04N 21/6125 | 725/112 |
| 2011/0137592 A1* | 6/2011 | Kim | G01R 21/1338 | 702/62 |
| 2011/0196983 A1* | 8/2011 | Goodmon | H04H 60/58 | 709/231 |
| 2011/0279311 A1* | 11/2011 | Hamano | G06F 16/58 | 707/769 |
| 2011/0298596 A1* | 12/2011 | Warrick | H04L 12/282 | 340/12.53 |
| 2011/0302607 A1* | 12/2011 | Warrick | H04N 21/41265 | 725/39 |
| 2012/0127374 A1* | 5/2012 | Kanojia | H04H 60/82 | 348/731 |
| 2012/0192234 A1* | 7/2012 | Britt | H04N 21/4882 | 725/98 |
| 2012/0266201 A1* | 10/2012 | Kanojia | H04N 21/25841 | 725/109 |
| 2012/0317596 A1* | 12/2012 | O'Neil | H04N 21/25825 | 725/25 |
| 2013/0127665 A1* | 5/2013 | Miller | H01Q 1/42 | 342/359 |
| 2013/0198787 A1* | 8/2013 | Perry, II | H04N 21/2585 | 725/86 |
| 2013/0227708 A1* | 8/2013 | Goodmon | H04L 63/107 | 726/27 |
| 2013/0252583 A1 | 9/2013 | Brown et al. | | |
| 2013/0276017 A1* | 10/2013 | Walker | H04N 21/4524 | 725/31 |
| 2014/0013342 A1* | 1/2014 | Swan | H04N 21/4821 | 725/92 |
| 2014/0026193 A1 | 1/2014 | Saxman et al. | | |
| 2014/0096163 A1* | 4/2014 | Perry, II | H04W 4/06 | 725/74 |
| 2015/0230004 A1* | 8/2015 | VanDuyn | H04N 21/2541 | 725/27 |
| 2018/0035146 A1* | 2/2018 | Goetz | H04N 21/266 | |
| 2018/0359529 A1* | 12/2018 | Hasek | G06F 3/0482 | |
| 2020/0084486 A1* | 3/2020 | Cho | G06F 21/335 | |
| 2020/0213637 A1* | 7/2020 | Swan | H04N 21/41265 | |
| 2020/0314495 A1* | 10/2020 | Wittke | H04N 21/4532 | |
| 2020/0359077 A1* | 11/2020 | Das | H04N 21/4826 | |
| 2021/0029402 A1* | 1/2021 | Das | H04N 21/64322 | |
| 2021/0321148 A1* | 10/2021 | Swan | H04N 21/2343 | |

* cited by examiner

LOCATION RESTRICTED CONTENT STREAMING TO NON-LOCATION AWARE DEVICES

BACKGROUND

Content, such as live broadcasts of sporting events, local television, etc., is often location restricted by contracts between the producer of the content and the entity (e.g., television stations, cable networks) that provide the content to consumers, referred to herein as "location restricted content." Traditionally, location restriction of content was enforceable because the entities that provided the content to consumers had closed systems in which the entity maintained stationary devices at each consumer location and knew the location (e.g., zip code) corresponding to those devices and/or delivered the content over fixed communication lines (e.g., cable) so the entity could determine which areas received the content and which did not. However, because content is now often streamed or otherwise delivered over the Internet (or other public network) to devices (e.g., laptops, tablets, wearables) that cannot necessarily be associated with a defined location or area, traditional systems are not able to determine whether content that is restricted by location should be delivered to those devices.

DETAILED DESCRIPTION

Figure 1A:
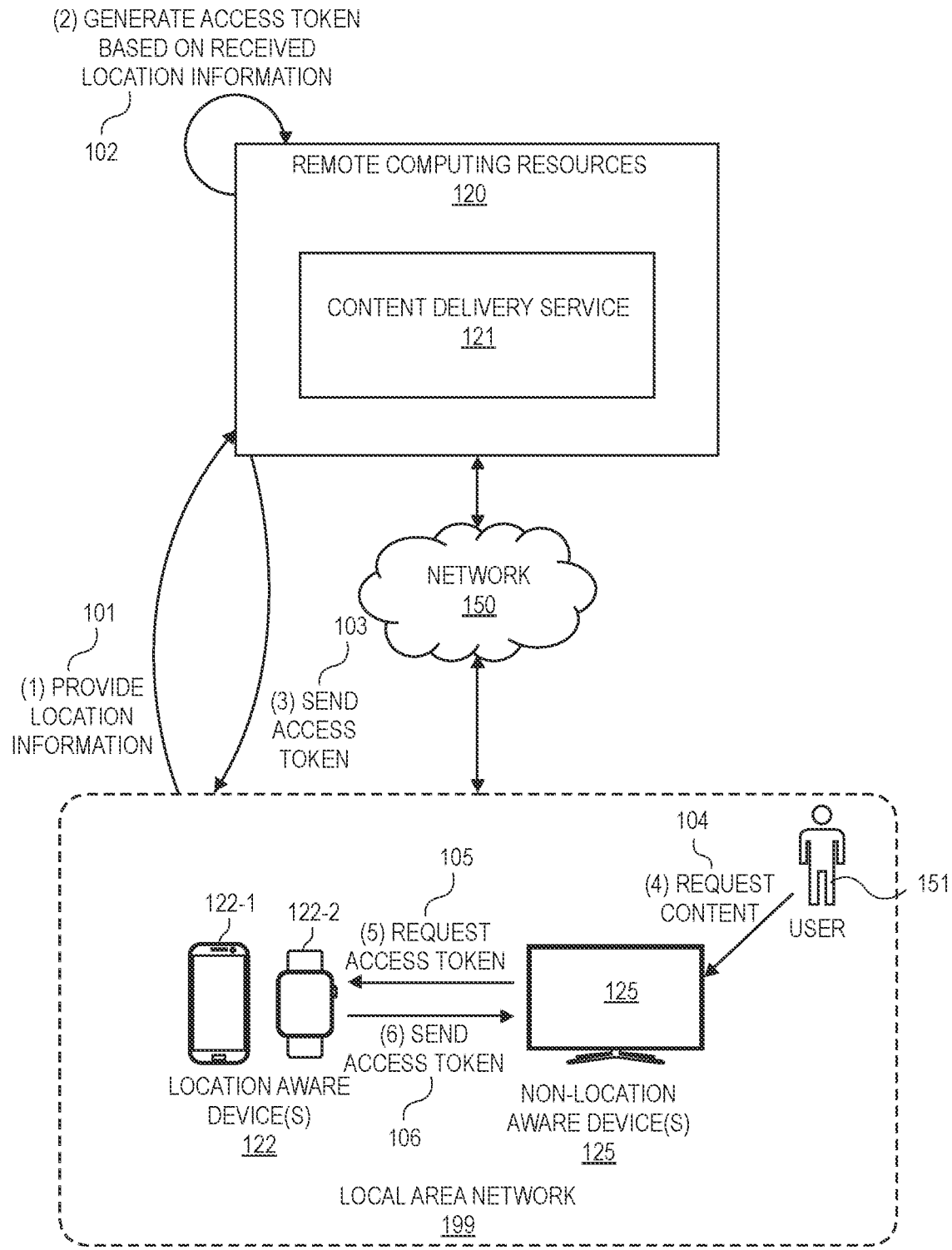
FIGS. 1A through 1B is a transition diagram illustrating the use of access tokens generated by one or more location aware devices to enable streaming of location restricted content to a non-location aware device, in accordance with disclosed implementations.

Disclosed are apparatus, systems, and methods to deliver location restricted content to devices that do not have a location component (e.g., Global Positioning System ("GPS") component), referred to herein as a "non-location aware device." As discussed further below, a device that includes a location component, referred to herein as a "location aware device," may send, to a content delivery service, location information determined by a location component of the location aware device. A "location component," as used herein, refers to any type of location component that is able to provide sufficiently reliable location information to a location aware device. As is known, such location components may maintain device location information at the operating system level such that the location information is reliable. For example, a location component may be a GPS component, an indoor positioning component, a location aware device provider specific component, etc.

The content delivery service may utilize the location information received from the location aware device to generate an access token and then send the access token back to the location aware device. The access token may be utilized to verify whether a device is within a defined area for which location restricted content can be delivered.

For example, the location aware device, upon receiving the access token, may share the access token with one or more other devices connected to the same local area network ("LAN"), such as a network at a user's home. Other devices connected to the same LAN, such as non-location aware devices, may utilize the access token received from the location aware device to request and receive location restricted content from the content delivery service. In one example, a non-location aware device connected to the same LAN as a location aware device may receive an access token from the location aware device and provide the access token to the content delivery service along with a request for content (e.g., location restricted content). The content delivery service may utilize the access token received with the request for content from the non-location aware device to verify that the non-location aware device is within a defined area to which the requested location restricted content is allowed to be delivered.

Because the content delivery service generated the access token based on location information received from the location aware device and because the location aware device and the non-location aware device are connected to the same LAN, the content delivery service can verify whether the requesting non-location aware device is within a defined area for which the requested location restricted content is allowed for presentation. For example, the content delivery service may use the location of the location aware device that is included in the access token provided by the non-location aware device as a proxy or approximate location of the non-location aware device.

In some implementations, the content delivery service may also associate the access token with the non-location aware device such that the access token is only usable by that non-location aware device. In such an example, other non-location aware devices connected to the same LAN may obtain a different access token from the same or different location aware device. In other examples, multiple non-location aware devices connected to the same LAN may utilize the same access token received from a location aware device also connected to the same LAN.

Figure 1B:
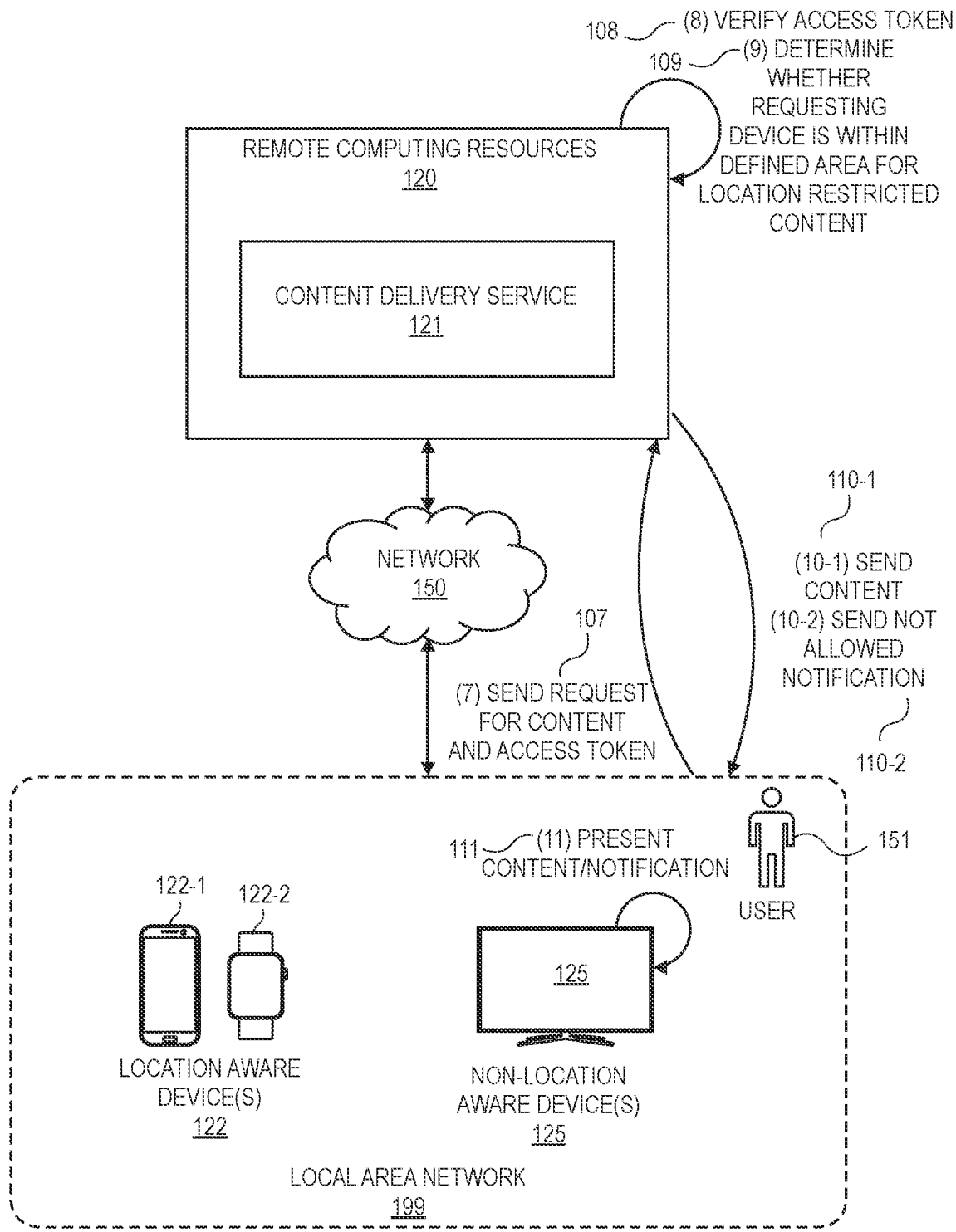

FIGS. 1A through 1B is a transition diagram illustrating the use of access tokens generated by one or more location aware devices to enable streaming of location restricted content to a non-location aware device, in accordance with disclosed implementations.

Turning first to FIG. TA, in accordance with the disclosed implementations, one or more location aware devices 122, such as a smartphone 122-1, a wearable 122-2, etc., and one or more non-location aware devices 125, such as a television, desktop computer, tablet, etc., are connected to the same local area network ("LAN") 199, such as a LAN in a home of a user 151. As discussed below, the LAN may be any type of local area network, such as a wireless Wi-Fi network, a wired network, or any combination thereof.

In some implementations, a location aware device 122 may periodically send location information via the local area network 199 and a public network 150, such as the Internet, to a content delivery service 121 operating on one or more remote computing resources 120, as in 101. The location information, may include, among other information, a current or last known (buffered) location of the location aware device 122, as determined by a location component included in the location aware device 122, a device identifier and/or device type, an IP address of the device, LAN information for the LAN in which the location aware device is connected, a timestamp indicating a time at which the location of the device was determined, a timestamp indicating a time at which the location information was generated, etc. In some examples, the location information may be generated in real time or near real time as a location of the location aware device is determined by a location component of the location aware device 122. In other implementations, if the location component of the location aware device cannot determine a location of the location aware device, for example if the location component is a GPS component and the location aware device is in a basement of the home of the user 151, the location information may include a last determined location of the location aware device and a timestamp indicating when the last known location was determined.

The content delivery service 121, upon receiving the location information from the location aware device 122, generates an access token based on the received location information, as in 102. In some implementations, the access token may include, among other information, the location information received from the location aware device 122, a timestamp indicating a time at which the access token is generated, a time to live ("TTL") indicating a time duration for which the access token is valid, etc. In some examples, some or all of the information included in the access token may be encrypted. For example, the location information received from the location aware device 122 may be encrypted using a private key known only to the content delivery service 121 such that only the content delivery service is able to decrypt the location information included in the access token (also known as symmetric encryption).

Encrypted location information that is included in the access token may be referred to herein as a location token. In some examples, the TTL may not be encrypted, but the entire access token, which may include the location token and the TTL, may be digitally signed by the content delivery service 121. In such an example, the TTL may be discernable to another device or entity beyond the content delivery service, but the location token included in the access token cannot be decrypted. In implementations in which the location information is encrypted into a location token and included in an access token along with the TTL, the access token may be anonymized such that it cannot be determined by any entity other than the content delivery service 121 as to the source or destination of the access token. Likewise, because the location information is encrypted in the access token, the content delivery service 121 may delete or otherwise discard all information related to the location aware device from which the location information was received after generation and delivery of the access token back to the location aware device.

In other implementations, rather than encrypting the location information received from the location aware device, a unique identifier, such as a randomly generated number, hash value, etc., may be associated with the received location information and the unique identifier and location information stored in a memory of the content delivery service. In such an example, the unique identifier may then be included in the access token as the location token, either encrypted or unencrypted.

Upon generation of the access token by the content delivery service 121, the content delivery service 121 sends the access token back to the location aware device 122 that sent the location information, as in 103, and the location aware device 122 may store the access token in a memory of the location aware device 122.

Turning now to the non-location aware device 125, in some implementations, the non-location aware device may send out a message, such as a broadcast message, on the LAN 199, requesting that any location aware device 122 connected to the LAN 199 provide to the non-location aware device 125 an access token, as in 105. For example, in some implementations, a user interacting with the non-location aware device 125 may request content to be presented by the non-location aware device 125, as in 104. In such an example, in response to receiving a request for content, the non-location aware device may send a message over the LAN 199 requesting an access token from a location aware device 122 that is also connected to the LAN 199.

In other implementations, the non-location aware device 125 may periodically send a message over the LAN 199 requesting an access token from one or more location aware devices 122 that are also connected to the LAN 199. For example, the non-location aware device 125 may be configured to monitor a TTL of access tokens previously received and stored in a memory of the non-location aware device 125 and upon expiration (or near expiration) of a TTL of a stored access token, the non-location aware device 125 may send out a request for another access token. In still other implementations, the non-location aware device 125 may periodically (e.g., hourly) send out a request over the LAN 199 for access tokens.

In response to a request for an access token from a non-location aware device 125 that is sent via the LAN 199, one or more location aware devices 122 that have a stored and valid access token, may send the stored access token to the non-location aware device 125, as in 106. Likewise, in some implementations, upon delivery of an access token to a non-location aware device on the LAN 199, the access token may be discarded by the location aware device 122 and the location aware device may request a new access token from the content delivery service 121 so that it has another access token to provide to the same or different non-location aware device when requested.

Turning now to FIG. 1B, the non-location aware device 125, upon receipt of the access token, may store the access token in a memory of the non-location aware device 125 and/or send the access token along with a request for content to the content delivery service 121, as in 107. For example, if the user 151 has requested that content be presented by the non-location aware device 125, the non-location aware device, upon obtaining an access token, may send the access token and the request for content to the content delivery service 121 via the network 150, as in 107.

The content delivery service 121, upon receiving the request for content and the access token, may verify that access token, as in 108. For example, the content delivery service 121 may determine that a signature applied to the access token by the content delivery service 121 when the access token was generated is secure/has not been altered. Likewise, the content delivery service 121 may verify that the TTL included in the access token is still valid.

In addition, the content delivery service 121 may access the location token included in the access token and determine whether the location information corresponding to the access token is within a defined area for which the requested content may be presented, as in 109. For example, if the location information received from a location aware device 122 was encrypted into the location token included in the access token, the location token may be decrypted and the location information determined. Alternatively, if the location token is a unique identifier associated with location information received from a location aware device 122, the unique identifier may be utilized to access the location information.

As discussed, location restricted content may be restricted such that the content delivery service 121 is only authorized to provide the content for presentation in defined areas (e.g., geographic areas, defined zip codes, postal codes, etc.). For example, location restricted content may be allowed for delivery and presentation into a first defined area but not allowed for delivery and presentation into a second defined area that is different than the first defined area. Accordingly, prior to providing location restricted content in response to a request for content from a non-location aware device 125, the location information included or accessible by the access token provided with the request for content may be utilized to confirm that the non-location aware device 125 is within a defined area for which the location restricted content may be presented.

As discussed herein, because the access token is secure, generated by the content delivery service 121, and includes location information corresponding to a location aware device 122 that is connected to a same LAN 199 as the non-location aware device 125, the location of the location aware device 122 may be utilized as a proxy or approximate location of the non-location aware device 125 to determine whether the requesting non-location aware device 125 is within a defined area for which location restricted content may be provided to the non-location aware device 125 for presentation.

If it is determined by the content delivery service 121 that the non-location aware device 125 is within the defined area for which the content may be provided for presentation, the content delivery service 121 sends the content to the non-location aware device 125 for presentation by the non-location aware device 125 to the user 151, as in 110-1. In comparison, if it is determined that the non-location aware device 125 is not within a defined area for which the location restricted content may be sent for presentation, a notification may be sent by the content delivery service 121 to the non-location aware device 125 indicating that the requested content is not available for presentation by the non-location aware device 125, as in 110-2.

Finally, if the non-location aware device 125 receives the requested content from the content delivery service 121, the non-location aware device 125 may present the content to the user 151, for example, via a display, speakers, and/or other output(s) of the non-location aware device 125, as in 111. For example, the non-location aware device 125 may stream and present the content to the user 151 as the content is received from the content delivery service 121. In comparison, if the non-location aware device 125 receives a notification that the requested content is not available, the non-location aware device 125 may present a notification to the user 151 indicating that the requested content is not currently available for presentation.

In some implementations, upon verification of the access token, the access token may be associated with the requesting non-location aware device 125 and the association maintained in a memory of the content delivery service 121.

In such an example, the non-location aware device may utilize the same access token to request multiple items of content from the content delivery service, for example, until the TTL of the token expires. Each time the non-location aware device requests content, the content delivery service may verify the token, confirm that the token is associated with the requesting non-location aware device, and determine whether the non-location aware device is within a defined area for which the requested content may be delivered for presentation.

In some implementations, a location aware device may only request an access token from the content delivery service in response to a request from a non-location aware device for an access token. In such an example, the location aware device may receive a non-location aware device identifier and provide that non-location aware device identifier in the request for the access token. Likewise, the content delivery service, upon receiving the request for the access token and as part of generating the access token, may associate the access token with the non-location aware device identifier. Subsequently, when the access token and request for content is received from the non-location aware device, the content delivery service, as part of verifying the access token, may confirm that the access token was received from the non-location aware device with which it was associated when the access token was created.

Figure 2A:
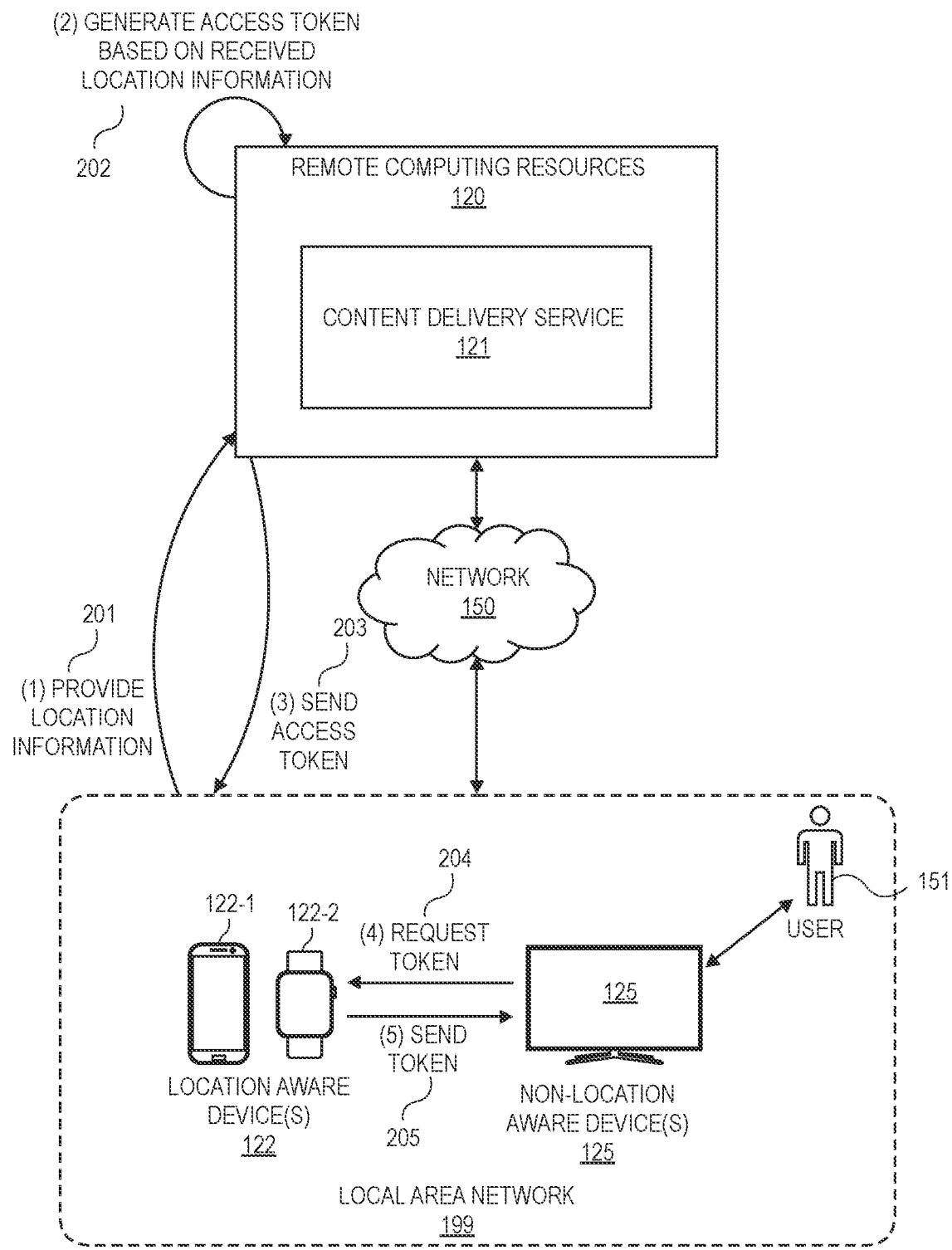
FIGS. 2A through 2C is a transition diagram illustrating the use of an access token generated by a location aware device to determine content options to present as available for presentation by a non-location aware device, in accordance with disclosed implementations.
Figure 2B:
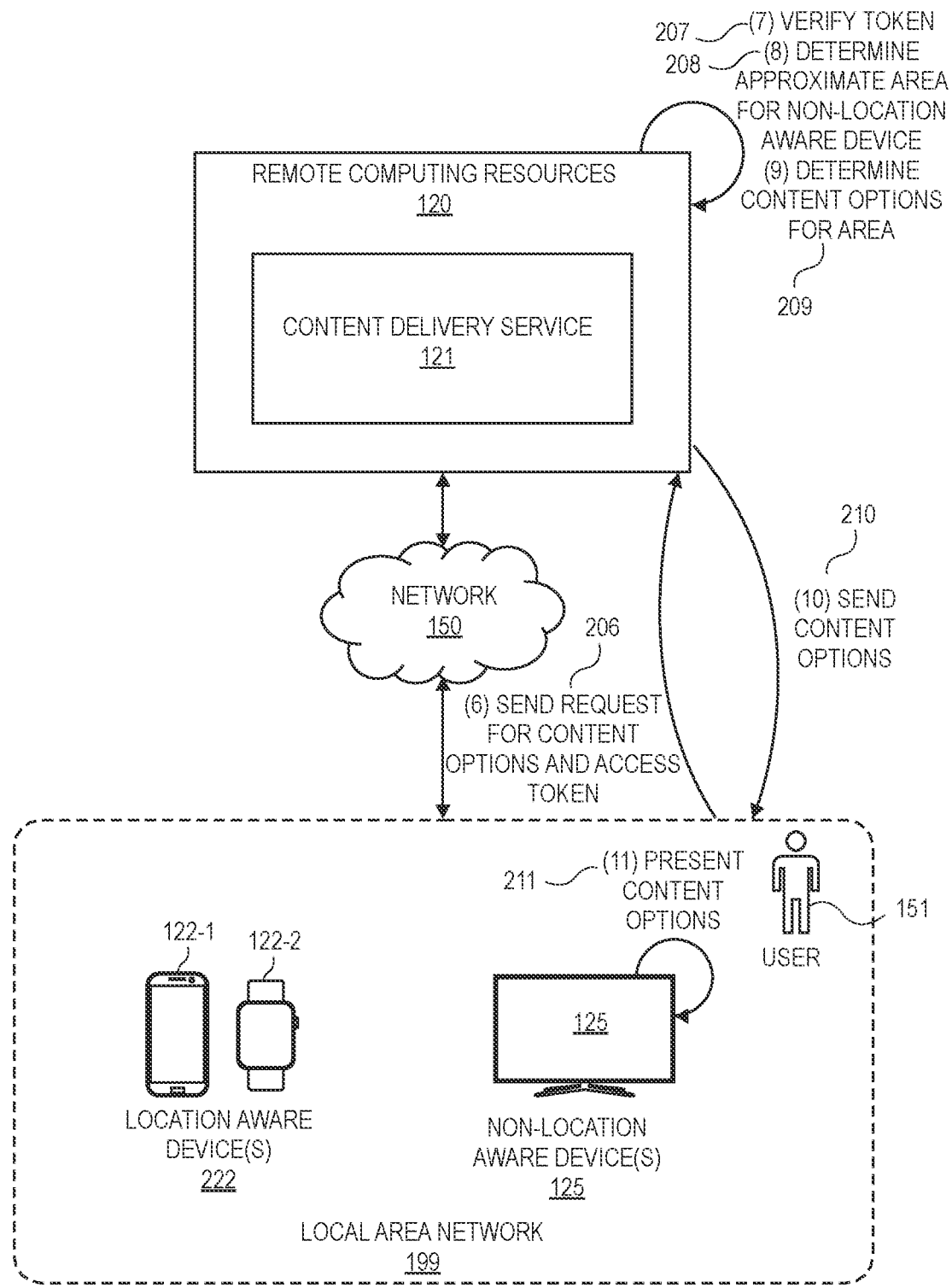
Figure 2C:
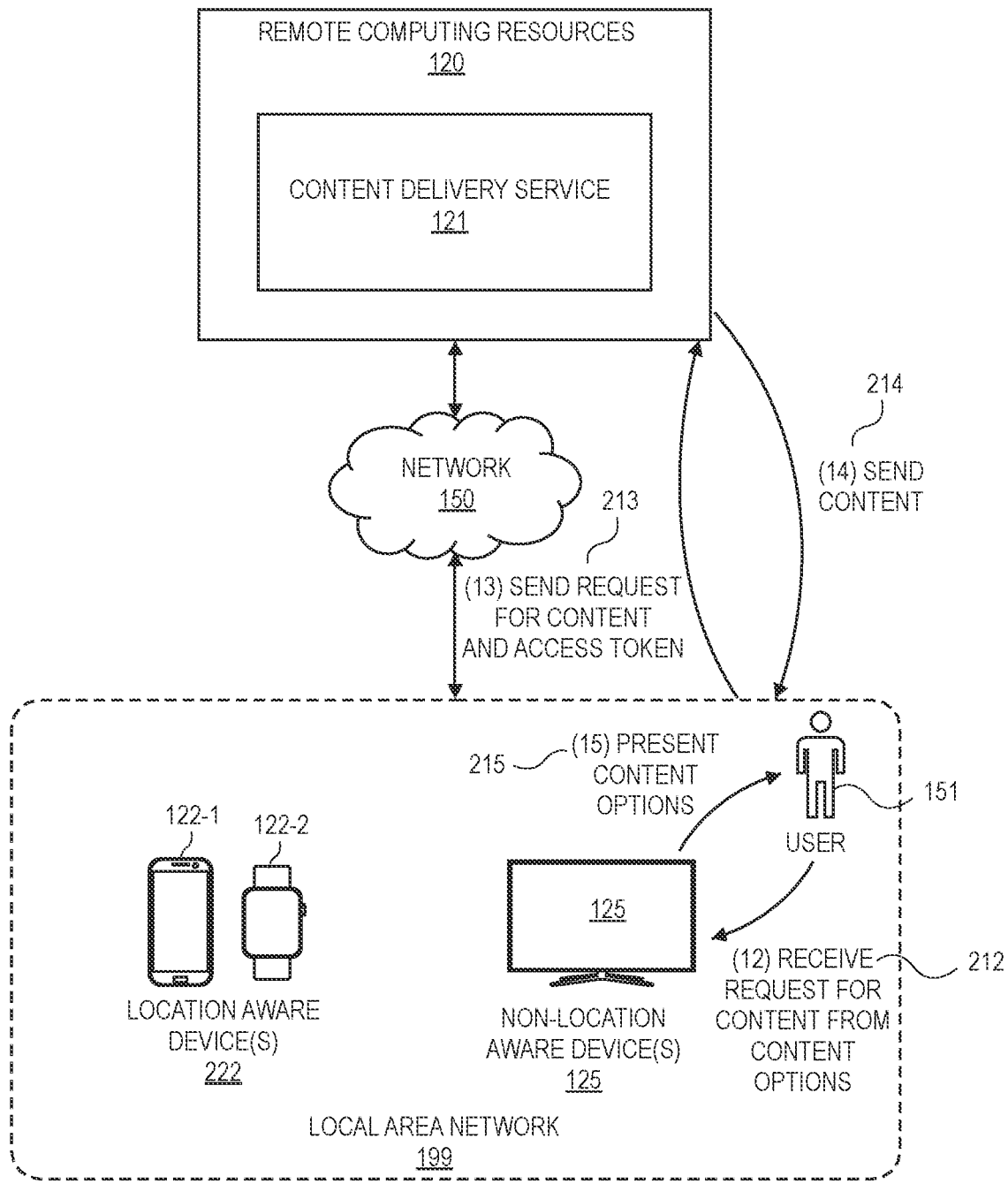

FIGS. 2A through 2C is a transition diagram illustrating the use of an access token generated by a location aware device 122 to determine content options to present as available for presentation by a non-location aware device 125, in accordance with disclosed implementations.

Turning first to FIG. 2A, in accordance with the disclosed implementations, one or more location aware devices 122, such as a smartphone 122-1, a wearable 122-2, etc., and one or more non-location aware devices 125, such as a television, desktop computer, tablet, etc., are connected to the same local area network ("LAN") 199, such as a LAN in a home of a user 151. As discussed below, the LAN may be any type of local area network, such as a wireless Wi-Fi network, a wired network, or any combination thereof.

In some implementations, a location aware device 122 may periodically send location information via the local area network 199 and a public network 150, such as the Internet, to a content delivery service 121 operating on one or more remote computing resources 120, as in 201. The location information, may include, among other information, a current or last known (buffered) location of the location aware device 122, as determined by a location component included in the location aware device 122, a device identifier and/or device type, an IP address of the device, LAN information for the LAN 199 in which the location aware device is connected, a timestamp indicating a time at which the location of the device was determined, a timestamp indicating a time at which the location information was generated, etc. In some examples, the location information may be generated in real time or near real time as a location of the location aware device 122 is determined by a location component of the location aware device 122. In other implementations, if the location component of the location aware device 122 cannot determine a location of the location aware device, for example if the location component is a GPS component and the location aware device is in a basement of the home of the user 151, the location information may include a last determined location of the location aware device 122 and a timestamp indicating when the last known location was determined.

The content delivery service 121, upon receiving the location information from the location aware device 122, generates an access token based on the received location information, as in 202. In some implementations, the access token may include, among other information, the location information received from the location aware device 122, a timestamp indicating a time at which the access token is generated, a time to live ("TTL") indicating a time duration for which the access token is valid, etc. In some examples, some or all of the information included in the access token may be encrypted. For example, the location information received from the location aware device 122 may be encrypted using a private key known only to the content delivery service 121 such that only the content delivery service is able to decrypt the location information included in the access token (also known as symmetric encryption).

Encrypted location information that is included in the access token may be referred to herein as a location token. In some examples, the TTL may not be encrypted, but the entire access token, which may include the location token and the TTL, may be digitally signed by the content delivery service 121. In such an example, the TTL may be discernable to another device or entity beyond the content delivery service, but the location token included in the access token cannot be decrypted. In implementations in which the location information is encrypted into a location token and included in an access token along with the TTL, the access token may be anonymized such that it cannot be determined by any entity other than the content delivery service 121 as to the source or destination of the access token. Likewise, because the location information is encrypted in the access token, the content delivery service 121 may delete or otherwise discard all information related to the location aware device 122 from which the location information was received after generation and delivery of the access token back to the location aware device.

In other implementations, rather than encrypting the location information received from the location aware device 122, a unique identifier, such as a randomly generated number, hash value, etc., may be associated with the received location information and the unique identifier and location information stored in a memory of the content delivery service 121. In such an example, the unique identifier may then be included in the access token as the location token, either encrypted or unencrypted.

Upon generation of the access token by the content delivery service 121, the content delivery service 121 sends the access token back to the location aware device 122 that sent the location information, as in 203, and the location aware device 122 may store the access token in a memory of the location aware device 122.

Turning now to the non-location aware device 125, the non-location aware device may send out a message, such as a broadcast message, on the LAN 199, requesting that any location aware device 122 connected to the LAN 199 provide to the non-location aware device 125 an access token, as in 204. For example, the non-location aware device 125 may periodically send a message over the LAN 199 requesting an access token from one or more location aware devices 122 that are also connected to the LAN 199. For example, the non-location aware device 125 may be configured to monitor a TTL of access tokens previously received and stored in a memory of the non-location aware device 125 and upon expiration (or near expiration) of a TTL of a stored access token, the non-location aware device 125 may send out a request for another access token. In still other implementations, the non-location aware device 125 may periodically (e.g., hourly) send out a request over the LAN for access tokens.

In response to a request for an access token from a non-location aware device 125 that is sent via the LAN 199, one or more location aware devices 122 that have a stored and valid access token, may send the stored access token to the non-location aware device 125, as in 205. Likewise, in some implementations, upon delivery of an access token to a non-location aware device on the LAN 199, the access token may be discarded by the location aware device 122 and the location aware device may request a new access token from the content delivery service 121 so that it has another access token to provide to the same or different non-location aware device when requested.

Turning now to FIG. 2B, the non-location aware device 125, upon receipt of the access token, may store the access token in a memory of the non-location aware device 125 and/or send the access token along with a request for content options to the content delivery service 121, as in 206.

The content delivery service, upon receiving the request for content options and the access token, may verify that access token, as in 207. For example, the content delivery service 121 may determine that a signature applied to the access token by the content delivery service when the access token was generated is secure/has not been altered. Likewise, the content delivery service 121 may verify that the TTL included in the access token is still valid.

In addition, the content delivery service 121 may access the location token included in the access token and determine an approximate location for the non-location aware device 125, as in 208. For example, if the location information received from a location aware device 122 was encrypted into the location token included in the access token, the location token may be decrypted, and the location information determined and used to determine an approximate location of the non-location aware device 125. Alternatively, if the location token is a unique identifier associated with location information received from a location aware device 122, the unique identifier may be utilized to access the location information.

As discussed, location restricted content may be restricted such that the content delivery service 121 is only authorized to provide the content for presentation in defined areas (e.g., geographic areas, defined zip codes, postal codes, etc.). For example, location restricted content may be allowed for delivery and presentation in a first defined area but not allowed for delivery and presentation in a second defined area that is different than the first defined area. Accordingly, prior to providing content options to the non-location aware device 125, the location information included or accessible by the access token provided with the request for content options may be utilized to determine the approximate location of the non-location aware device and that approximate location utilized to determine location restricted content that is available for delivery to and presentation by the non-location aware device, as in 209.

As discussed herein, because the access token is secure, generated by the content delivery service 121, and includes location information corresponding to a location aware device 122 that is connected to a same LAN 199 as the non-location aware device 125, the location of the location aware device 122 may be utilized as a proxy and/or to determine an approximate location of the non-location aware device. The location information and/or the approximate location may then be utilized to determine location restricted content that is available for delivery to and presentation by the non-location aware device.

Upon determination of location restricted content that is available for delivery to and presentation by the non-location aware device 125, and optionally content that is not location restricted, an indication or list of content options may be generated and sent to the non-location aware device, as in 210. For example, content options may include an indication of some or all of the location restricted content that is currently available to the non-location aware device 125 based on the approximate location determined for the non-location aware device from the access token. As will be appreciated, the approximate location of the non-location aware device 125 may be the location of the location aware device 122, as determined from the location information included in the access token. In other implementations, the approximate location of the non-location aware device 125 may be an area or distance around the location of the location aware device 122 as indicated in the access token. Upon receipt of the content options, some or all of the content options may be presented by the non-location aware device 125 to a user 151 for selection, as in 211.

Turning now to FIG. 2C, the user 151 may then select and submit a request for content indicated in the content options presented to the user, as in 212. In response to a user selection of content from the content options, a request for the content is sent from the non-location aware device 125 to the content delivery service 121, as in 213. In some implementations, the access token stored in the memory of the non-location aware device 125 may also be sent with the request for content and the content delivery service 121 may again verify that that requested content may be sent to the non-location aware device for presentation based on the access token, as discussed above with respect to FIGS. 1A though 1B. Alternatively, as illustrated in FIG. 2C, because the content delivery service 121 has already determined the approximate location of the non-location aware device 125 and only provided as content options, content that is available for delivery to and presentation by the non-location aware device, re-verification of the location of the non-location aware device may be omitted.

Accordingly, upon receipt of the request for content selected from the content options, the content is sent from the content delivery service 121 to the non-location aware device 125, as in 214. Finally, the non-location aware device 125, upon receipt of some or all of the requested content may present the requested content to the user 151, as in 215. For example, the non-location aware device 125 may stream and present the content to the user as the content is received by the non-location aware device.

In some implementations, upon verification of the access token, the access token may be associated with the requesting non-location aware device 125 and the association maintained in a memory of the content delivery service 121. In such an example, the non-location aware device may utilize the same access token to request multiple items of content from the content delivery service, for example, until the TTL of the token expires. Each time the non-location aware device requests content, the content delivery service may verify the token, confirm that the token is associated with the requesting non-location aware device, and determine whether the non-location aware device is within a defined area for which the requested content may be delivered for presentation.

In some implementations, a location aware device may only request an access token from the content delivery service in response to a request from a non-location aware device for an access token. In such an example, the location aware device may receive a non-location aware device identifier and provide that non-location aware device identifier in the request for the access token. Likewise, the content delivery service, upon receiving the request for the access token and as part of generating the access token, may associate the access token with the non-location aware device identifier. Subsequently, when the access token and request for content is received from the non-location aware device, the content delivery service, as part of verifying the access token, may confirm that the access token was received from the non-location aware device with which it was associated when the access token was created.

Figure 3:
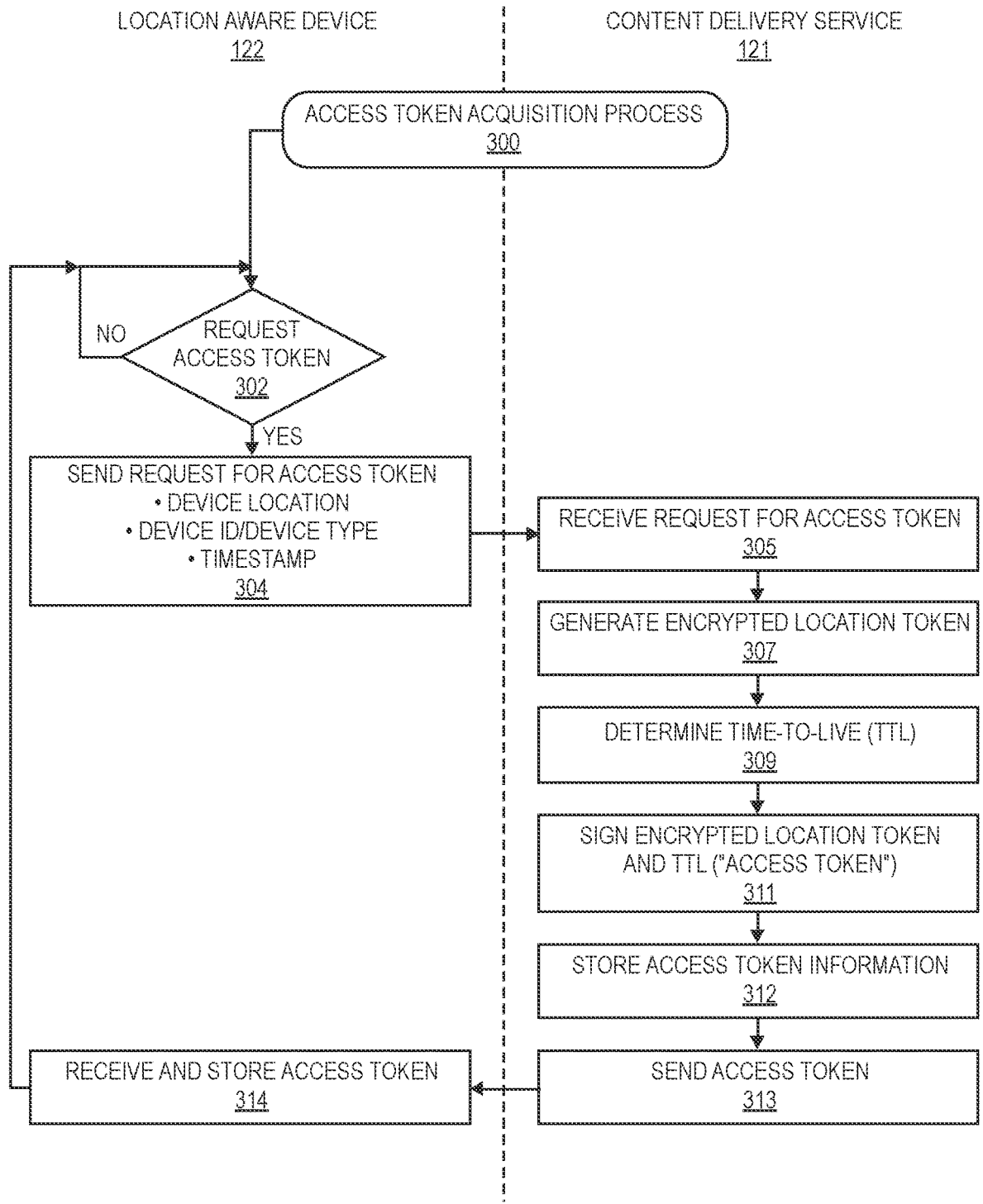
FIG. 3 is an example access token acquisition process, in accordance with disclosed implementations.

FIG. 3 is an example access token acquisition process 300, in accordance with disclosed implementations.

The example process 300 begins at a location aware device 122, with the location aware device determining if it should request an access token from the content delivery service 121, as in 302. For example, the location aware device may determine if it has a valid access token, for example by determining if the TTL on a previously received access token has expired. If it is determined that the location aware device does not need to request an access token, the example process 300 remains at block 302. As another example, the location aware device may only determine that it is to request a token in response to receiving a message from a non-location aware device requesting an access token.

If it is determined that an access token is to be requested, a request for an access token is sent from the location aware device to the content delivery service, as in 304. The request for an access token may include, among other information, device location information indicating a location of the device, a location aware device identifier and/or device type, a timestamp indicating when the location of the location aware device was last determined, a non-location aware device identifier of a non-location aware device to which the requested access token is to be provided, etc. In some implementations, the location of the location aware device may be determined by a location component (e.g., GPS) of the location aware device and maintained by lower-level operating systems of the location aware device. Accordingly, the location information may indicate GPS position of the location aware device as determined by the GPS component and/or other location indicating information.

As part of the example process 300, the content delivery service 121 receives the request for the access token, as in 305, and generates an encrypted location token, as in 307. For example, the location information received with the request may be encrypted with a private key that is only known to the content delivery service such that the location token can only be decrypted by the content delivery service, referred to as symmetric key encryption. In other implementations, the location token may be a unique identifier that is generated by the content delivery service, associated with the location information, and maintained in a data store by the content delivery service. In such an implementation, the location token may be encrypted and included in the access token, or may remain unencrypted and included in the access token.

In addition to generating the location token, a TTL for the access token is also determined, as in 309. In some implementations, all location aware devices may be assigned a same TTL (e.g., ten minutes). In other examples, different TTLs may be determined based on, for example, the type of location aware device, the location of the location aware device, etc. For example, if the location aware device is a smartphone or tablet that is easily and often moved between different locations/areas, a first TTL may be assigned to the device. In comparison, if the location aware device is a smart home appliance that includes a location component but not the type of device that is often moved (or is not battery powered), a second TTL may be assigned to the device, wherein the second TTL is longer than the first TTL.

The example process 300 may then generate an access token that includes the location token and the TTL, all of which may be digitally signed by the content delivery service, as in 311. In some implementations, the TTL may not be encrypted so that the TTL is accessible to the location aware device and/or non-location aware devices that receive the access token from the location aware device. In other implementations, the TTL may be encrypted. In still other examples, the TTL may be both stored encrypted and also stored unencrypted. Likewise, in some implementations, other information may also be included in the access token, encrypted and/or unencrypted.

Access token information may then be stored by the content delivery service, as in 312. For example, access token information indicating the location aware device to which the access token is being returned, a timestamp indicating when the access token was generated, a copy of the access token, a non-location aware device identifier to which the access token is to be provided, etc., may be stored in a memory of the content delivery service.

The access token may then be sent by the content delivery service to the location aware device that requested the access token, as in 314. The access token is then received and stored by the location aware device, as in 316. After storing the received access token, the example process 300 returns to block 302 and continues. In other implementations, as discussed herein, the location aware device may not store the access token and instead may forward the access token to a requesting non-location aware device. In such an example, once the access token has been provided to the non-location aware device, the example process 300 may return to decision bock 302 and continue.

Figure 4:
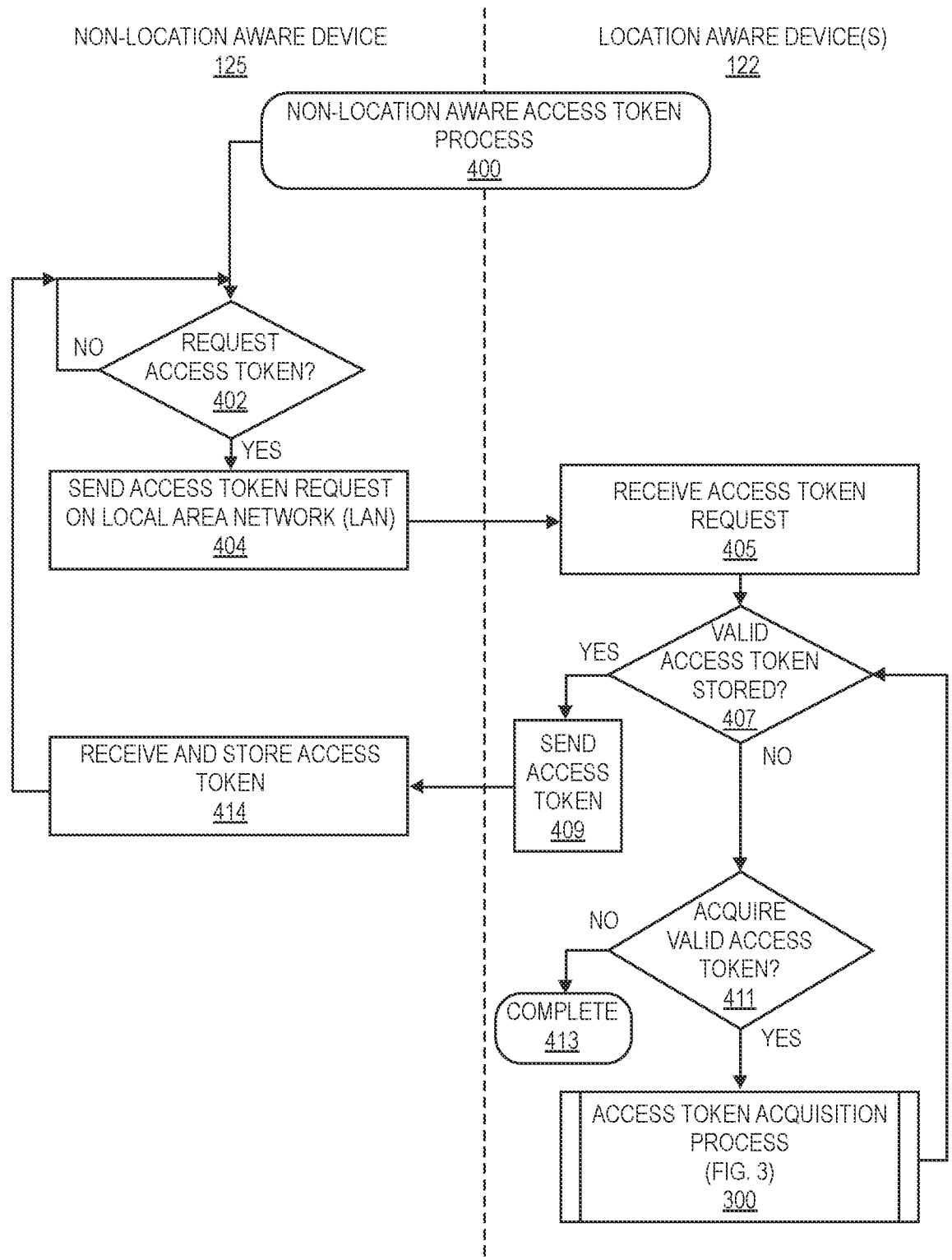
FIG. 4 is an example non-location aware access token process, in accordance with disclosed implementations.

FIG. 4 is an example non-location aware access token process 400, in accordance with disclosed implementations.

The example process 400 begins at a non-location aware device 125 with the non-location aware device determining if it needs to request an access token, as in 402. In some implementations, it may be determined that an access token is to be requested in response to a user requesting that content is to be obtained from the content delivery service for presentation. In other examples, the non-location aware device may periodically (e.g., every ten minutes) determine that it is to request access tokens. In still other examples, the non-location aware device may store valid access tokens in a memory and, upon expiration of some or all of the stored access tokens, may decide that an access token is to be requested. As discussed herein, in some implementations, a non-location aware device may collect access tokens from different location aware devices that are all connected to the same LAN as the non-location aware device and send some or all of those access tokens with a request for content. In such an example, the content delivery service may consider each of the received access tokens in determining the approximate location of the non-location aware device, thereby increasing confidence as to the approximate location of the non-location aware device. For example, the content delivery service may consider the location information included in each of the received access tokens to determine the approximate location of the non-location aware device. In some implementations, all received tokens may be given a same weight or importance in determining the approximate location of the non-location aware device. In other implementations, a weighting or importance of access tokens may be different, for example, based on a time at which each access token was created, etc.

If it is determined that an access token is not to be requested, the example process 400 returns to decision block 402 and continues. If it is determined that the access token is to be requested, an access token request may be sent or broadcasted on the LAN to which the non-location aware device is connected, as in 404.

When the non-location aware device sends a request for access tokens, one or more location aware devices connected to the same LAN as the non-location aware device may receive the request, as in 405. Each location aware device, upon receipt of a request for an access token, may determine if a valid access token is stored in a memory of the location aware device, as in 407. For example, as discussed above, a location aware device may obtain access tokens from the content delivery service and store the access tokens in a memory. Likewise, each access token may include a TTL. The TTL of a stored access token may be utilized to determine if the stored access token is valid. Alternatively, some or all location aware devices may not store access tokens and may only request an access token from the content delivery service in response to a request for a non-location aware device for an access token.

If it is determined that a valid access token is stored, the location aware device may provide the access token to the non-location aware device as responsive to the request for an access token, as in 409. Likewise, the non-location aware device, upon receiving the access token, may store the access token in a memory of the non-location aware device, as in 414. As access tokens are received and stored, the example process 400 may return to decision block 402 and continue.

If it is determined at decision block 407 that a location aware device does not have a stored valid access token, a determination is made as to whether a valid access token is to be acquired by the location aware device, as in 411. If it is determined that a valid access token is not to be acquired, the example process, for that location aware device, completes, as in 413. If it is determined that a valid access token is to be acquired, the example access token acquisition process discussed above with respect to FIG. 3 is performed by the location aware device, as in 300. After completion of the example process 300, the example process 400 returns to decision block 407 and continues.

As discussed above, the example process 400 may be performed with multiple location aware devices that are connected to the same LAN as the non-location aware device. For example, the non-location aware device may send out a broadcast message to all devices connected to the LAN and any device that is a location aware device may perform aspects of the example process 400 and provide an access token to the non-location aware device.

In other implementations, rather than a location aware device providing an access token in response to a request from a non-location aware device, the location aware device may periodically send or broadcast a valid access token across the LAN and any non-location aware device may receive and utilize/store the access token. In still other examples, some or all location aware devices connected to the LAN may periodically send a notification indicating that the location aware device has a valid access token. In such an example, the non-location aware device may receive the notification and determine if it is to request an access token from the location aware device that sent the notification. For example, if the non-location aware device already has a valid access token from that location aware device, it may determine that it does not need the access token from that location aware device. In comparison, if the non-location aware device does not have a valid access token from the location aware device that issued the notification, the non-location aware device may send a request to the location aware device requesting an access token from that location aware device.

Figure 5:
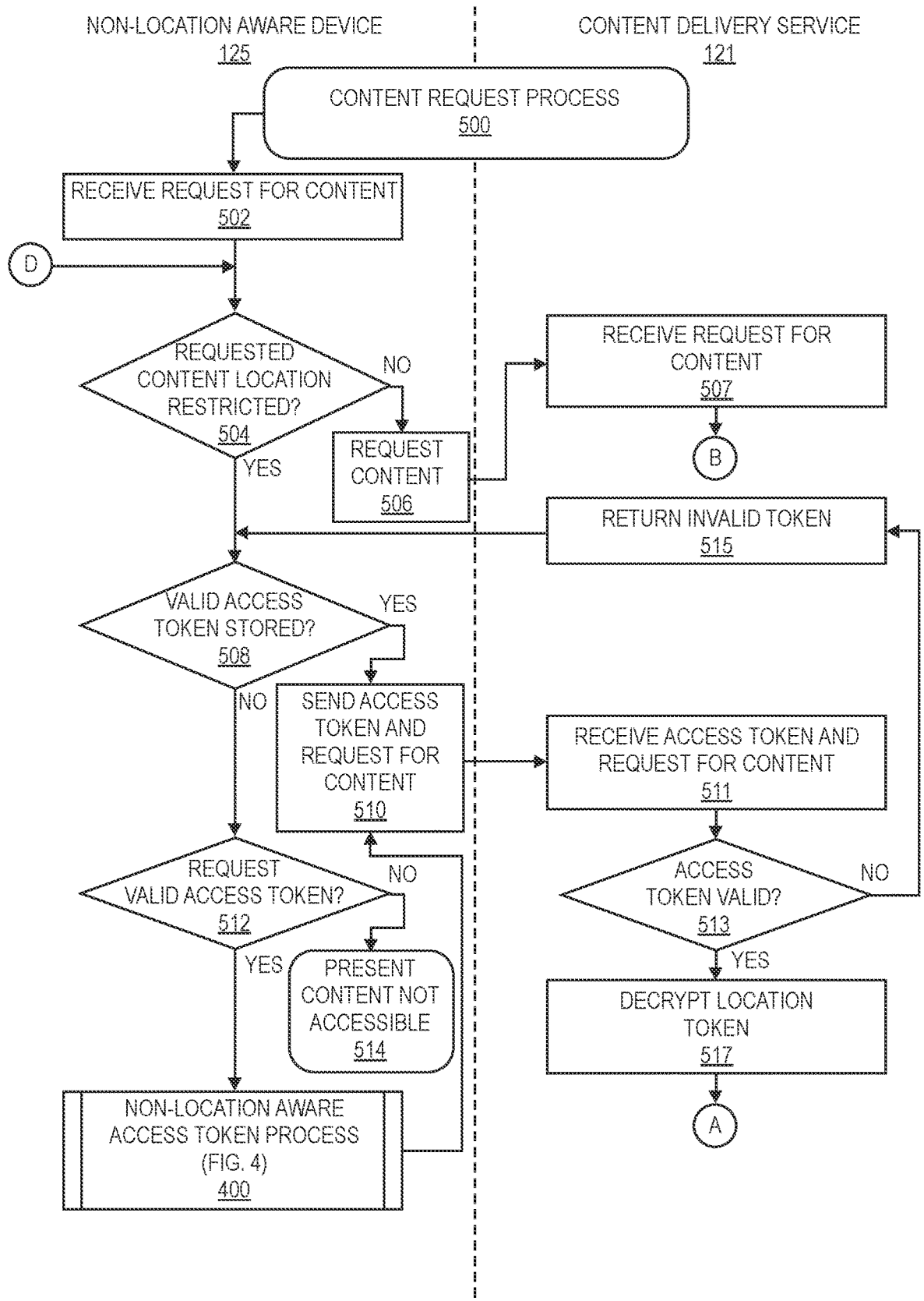
FIG. 5 is an example content request process, in accordance with disclosed implementations.
Figure 5:
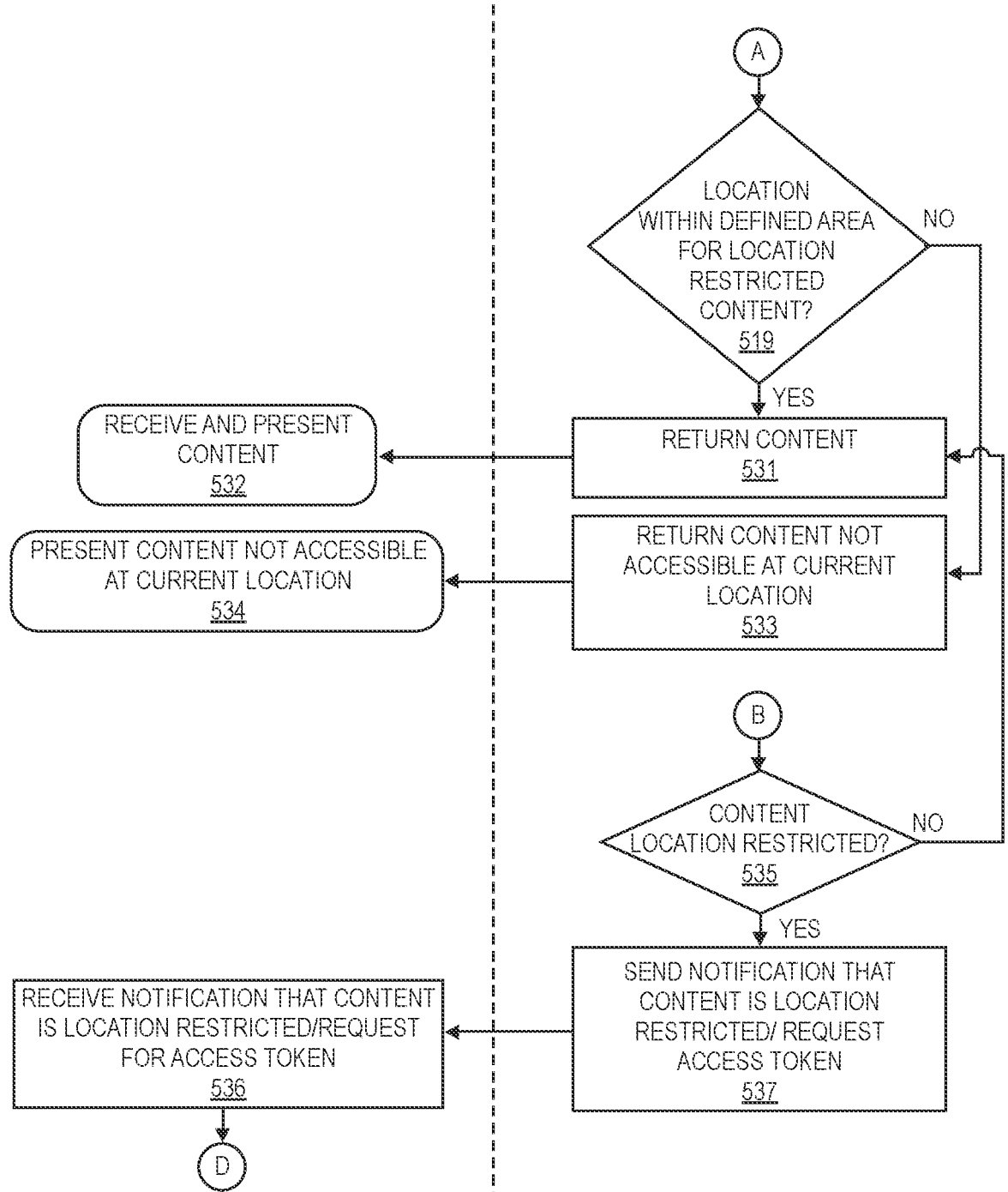

FIG. 5 is an example content request process 500, in accordance with disclosed implementations.

The example process 500 begins with a non-location aware device receiving a request for content, as in 502. Upon receipt of a request for content, a determination may be made as to whether the requested content is location restricted, as in 504. If it is determined that the requested content is not location restricted, the content is requested from the content delivery service, as in 506.

If it is determined that the content is location restricted, a determination is made as to whether a valid access token is stored in the memory of the non-location aware device 125, as in 508. As discussed above, a TTL may be assigned to an access token and the example process 500 may determine if a stored access token is valid based on the TTL.

If it is determined that a stored access token is maintained in memory, the access token and the request for the content is sent to the content delivery service, as in 510. If it is determined that a valid access token is not maintained by the non-location aware device, a determination is made as to whether a valid access token is to be requested, as in 512. If it is determined that a valid access token is not to be requested, a notification may be presented that the requested content is not accessible, as in 514, and the example process 500 may complete.

If it is determined that a valid access token is to be requested, the example non-location aware access token process discussed with respect to FIG. 4 may be performed, as in 400. Upon obtaining an access token at completion of the example process 400 (FIG. 4), or if it is determined at decision block 508 that a valid access token is stored in a memory of the non-location aware device, the access token and a request for content is sent from the non-location aware device to the content delivery service, as in 510.

In response to the non-location aware device sending a request for content and an access token, the content delivery service 121 receives the access token and request for content, as in 511, and determines if the access token is valid, as in 513. As discussed above, the access token may be processed to ensure that the digital signature applied to the access token by the content delivery service is still valid, has not been tampered with and/or it may be verified that the TTL of the token has not expired. In implementations in which an association between the access token and the non-location aware device is maintained by the content delivery service, as discussed above, validation may also include confirmation by the content delivery service that the non-location aware device that sent the request for content and the access token matches the non-location aware device that is associated with the access token.

If it is determined that the access token is not valid, the content delivery service may send a notification to the non-location aware device indicating that the token is invalid, as in 515, and the example process 500 may return to decision block 508 and continue. If it is determined that the received access token is valid, the location token included in the access token is decrypted to obtain the location information that was provided by a location aware device and utilized to generate the access token, as in 517. Alternatively, if the location token includes an unencrypted unique identifier, the unique identifier may be utilized to obtain the associated location information.

A determination may then be made as to whether the location indicated in the location information is within a defined area for the location restricted content, as in 519. As discussed above, location restricted content may be restricted such that the content delivery service is only authorized to provide the location restricted content to devices positioned within defined areas, but not to devices positioned outside those defined areas. For example, location restricted content may be authorized for delivery and presentation in a first defined area but not in a second defined area that is different than the first defined area.

If it is determined that the location indicated by the location information obtained from the location token included in the received access token is within a defined area for the location restricted content, the location restricted content is returned to the non-location aware device for presentation by the non-location aware device, as in 531, and the non-location aware device, upon receiving the content, may present the content to a user via one or more outputs (e.g., display, speakers, haptics) to the user(s) of the non-location aware device, as in 532.

If it is determined that the location indicated from the location information/unique identifier obtained from the location token included in the access token is not within a defined area for the location restricted content, a notification that the content is not available at the current location may be sent from the content delivery service to the non-location aware device, as in 533. The non-location aware device, upon receipt of the notification that the content is not available at the location, may present the notification on an output of the non-location aware device, as in 534, and the example process 500 may complete.

Returning to decision block 504, if it is determined that the requested content is not location restricted content, the non-location aware device may send a request for content to the content delivery service, as in 506. Likewise, the content delivery service may receive the request for content, as in 507, and upon receiving the request for content, may determine if the content is location restricted, as in 535. If it is determined that the requested content is not location restricted, the example process 500 returns to block 531 and continues. If it is determined that the requested content is location restricted, a notification may be sent from the content delivery service back to the non-location aware device indicating that the requested content is location restricted, as in 537. The non-location aware device may receive the notification that the requested content is location restricted, as in 536, and the example process 500 may return to decision block 504 and continue with the understanding that the requested content is location restricted.

While the example process 500 is described as initiating in response to a request for content, in other implementations, the example process 500 may be performed periodically, or upon request to obtain content options that may be presented to a user for selection. Likewise, while the example process 500 describes that the non-location aware device determines whether the requested content is location restricted, in some implementations, the non-location aware device may not determine whether the requested content is location restricted and may instead aways provide an access token with each request for content. In such an example, blocks 504, 506, 507, and 535 through 537 may be omitted.

In another example, the example process 500 may initially send the request for content without an access token and the content delivery service may determine if the requested content is location restricted.

Figure 6:
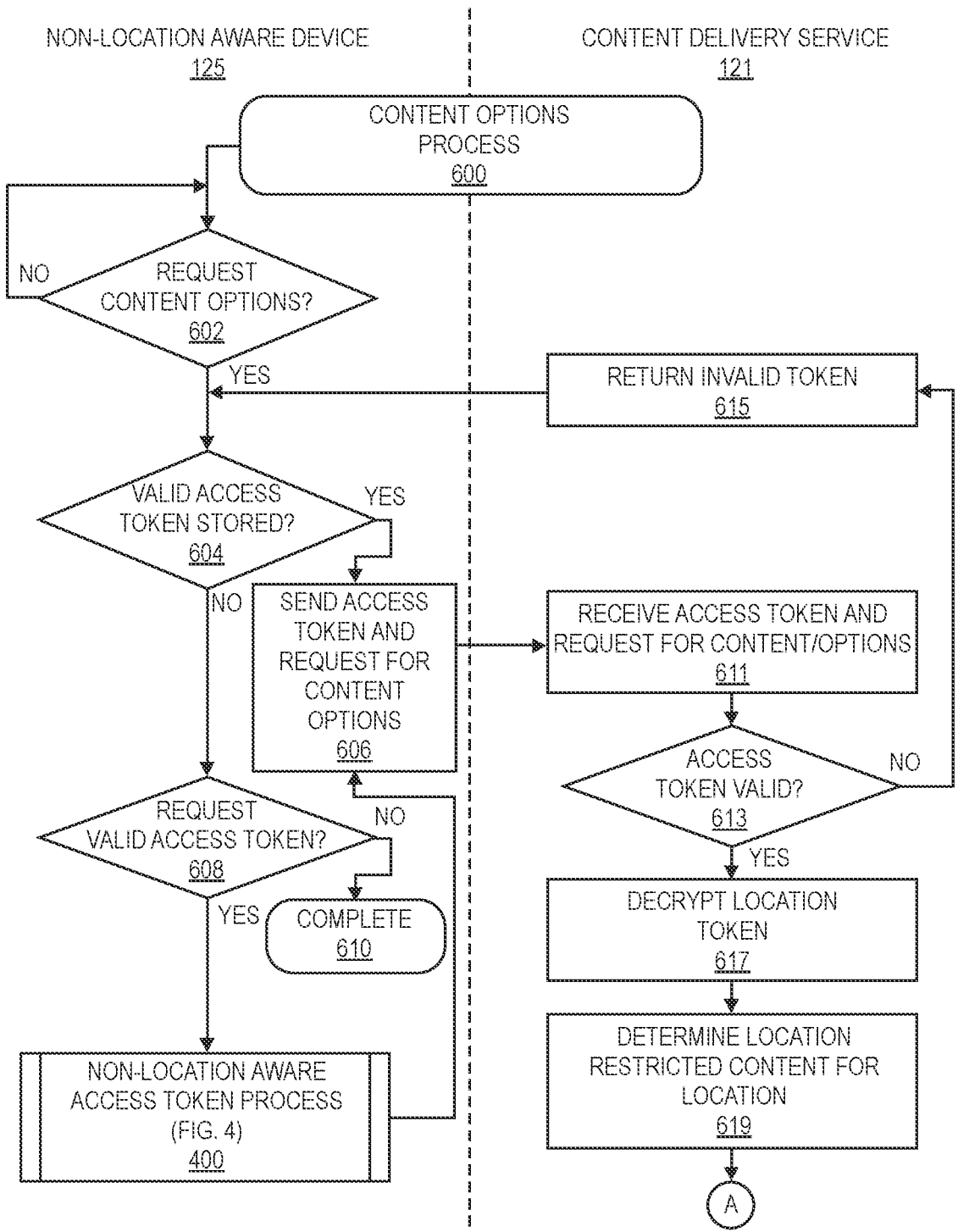
FIG. 6 is an example content options process, in accordance with disclosed implementations.
Figure 6:
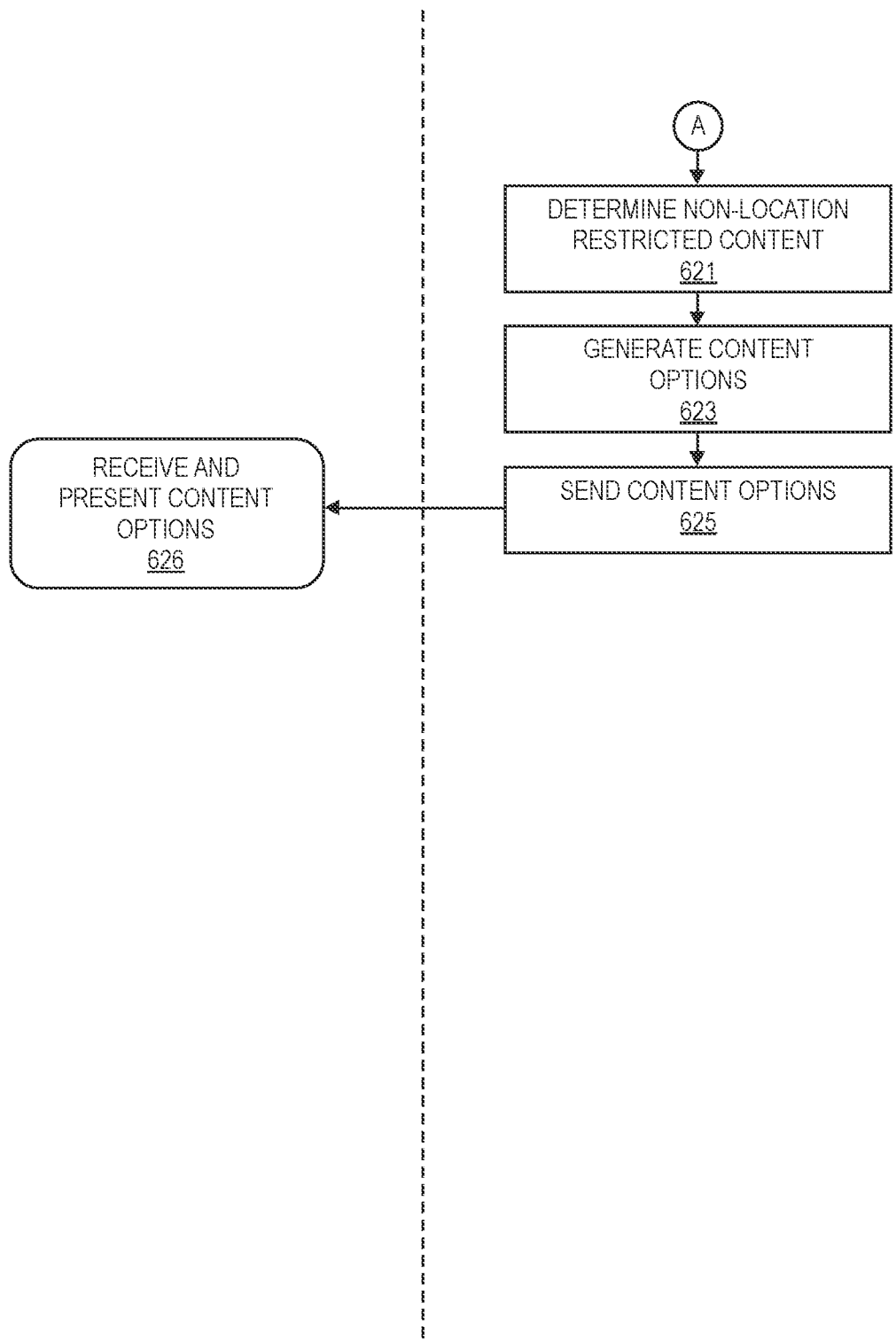

FIG. 6 is an example content options process 600, in accordance with disclosed implementations. The example process 600 may be performed in response to a user requesting content options, in response to a user accessing the non-location aware device, periodically so that content options are available for presentation via an output of the content aware device if requested, etc.

The example process 600 begins with a non-location aware device determining if content options are to be requested, as in 602. As discussed above, content options may be an indication of content, location restricted content and/or non-location restricted content that is available for presentation to the non-location aware device. If it is determined that content options are not to be requested, the example process 600 remains at decision block 602.

If it is determined that content options are to be requested, a determination is made as to whether a valid access token is stored in the memory of the non-location aware device 125, as in 604. As discussed above, a TTL may be assigned to an access token and the example process 600 may determine if a stored access token is valid based on the TTL.

If it is determined that a stored access token is maintained in memory, the access token and the request for content options is sent to the content delivery service, as in 606. If it is determined that a valid access token is not maintained by the non-location aware device, a determination is made as to whether the a valid access token is to be requested, as in 608. If it is determined that a valid access token is not to be requested, the example process 600 completes and content options are not presented, as in 610.

If it is determined that a valid access token is to be requested, the example non-location aware access token process discussed with respect to FIG. 4 may be performed, as in 400. Upon obtaining an access token at completion of the example process 400 (FIG. 4) or if it is determined at decision block 604 that a valid access token is stored in a memory of the non-location aware device, the access token and a request for content options is sent from the non-location aware device to the content delivery service, as in 606.

In response to the non-location aware device sending a request for content options and an access token, the content delivery service receives the access token and request for content options, as in 611, and determines if the access token is valid, as in 613. As discussed above, the access token may be processed to ensure that the digital signature applied to the access token by the content delivery service is still valid, has not been tampered with, and/or it may be verified that the TTL of the token has not expired. In implementations in which an association between the access token and the non-location aware device is maintained by the content delivery service, as discussed above, validation may also include confirmation by the content delivery service that the non-location aware device that sent the request for content and the access token matches the non-location aware device that is associated with the access token.

If it is determined that the access token is not valid, the content delivery service may send a notification to the non-location aware device indicating that the token is invalid, as in 615, and the example process 600 may return to decision block 604 and continue. If it is determined that the received access token is valid, the location token included in the access token is decrypted to obtain the location information that was provided by a location aware device and utilized to generate the access token, as in 617. Alternatively, if the location token includes an unencrypted unique identifier, the unique identifier may be utilized to obtain the associated location information.

The example process 600 may then determine location restricted content that is allowed to be delivered and presented to devices at the determined location, as in 619. Likewise, non-location restricted content that is available for delivery to and presentation by the non-location aware device may also be determined, as in 621.

Content options for the non-location aware device may then be generated that includes none, some, or all of the location restricted content that is determined to be available for delivery to, and presentation at, the location and/or none, some, or all of the non-location specific content, as in 623. Finally, the content options are sent from the content delivery service 121 to the non-location aware device, as in 625, received by the non-location aware device, and optionally presented by one or more outputs of the non-location aware device, as in 626.

When the content options are presented to a user accessing the non-location aware device, the user may select or request content indicated in the content options. In response to a user requesting content indicated in the content options, the example process 500, discussed with respect to FIG. 5 may be performed. Alternatively, as also discussed above, in some implementations, verification of the non-location aware device may be omitted since the content options were determined based on a verified location of the non-location aware device.

Figure 7:
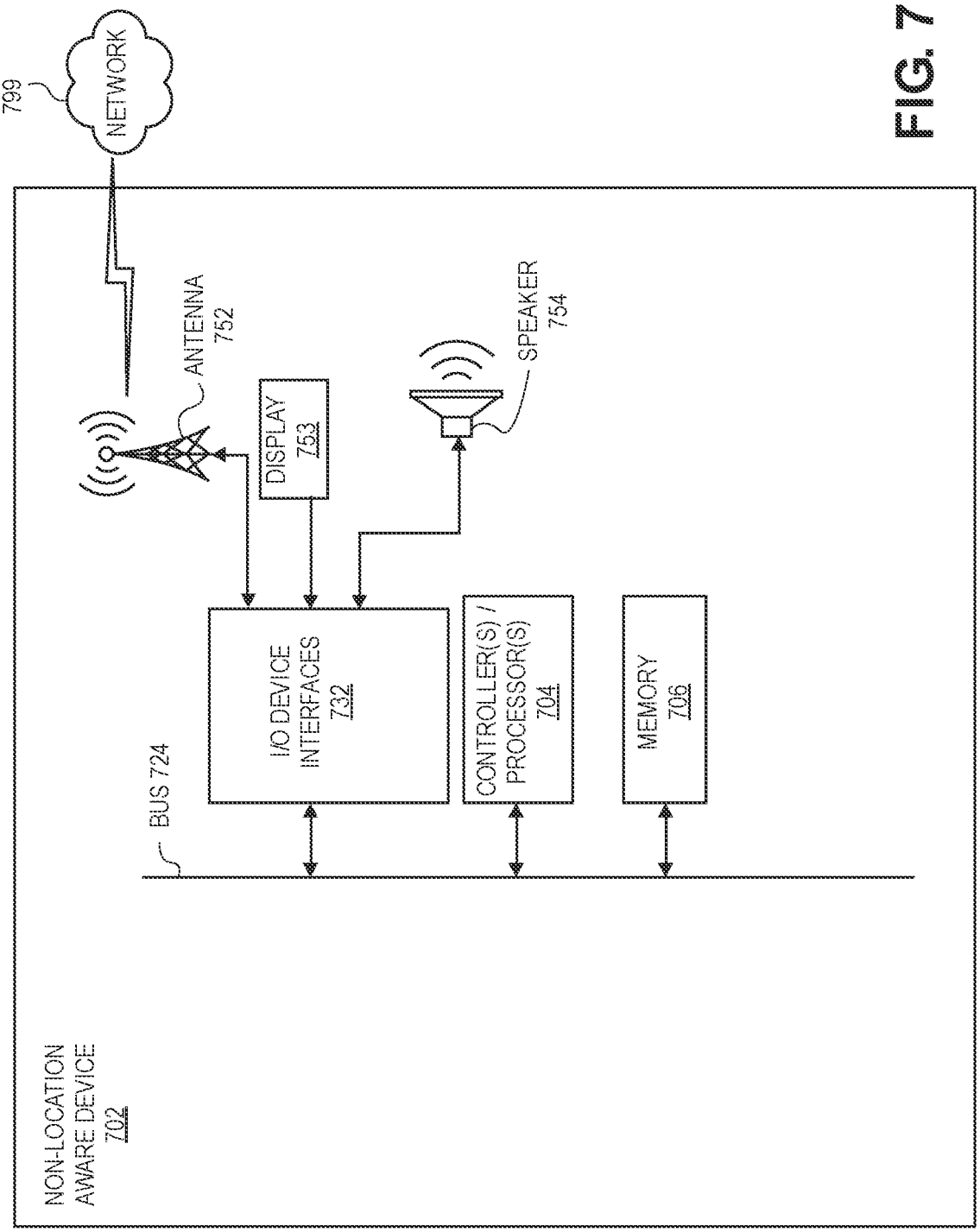
FIG. 7 illustrates example components of a non-location aware device, in accordance with disclosed implementations.
Figure 8:
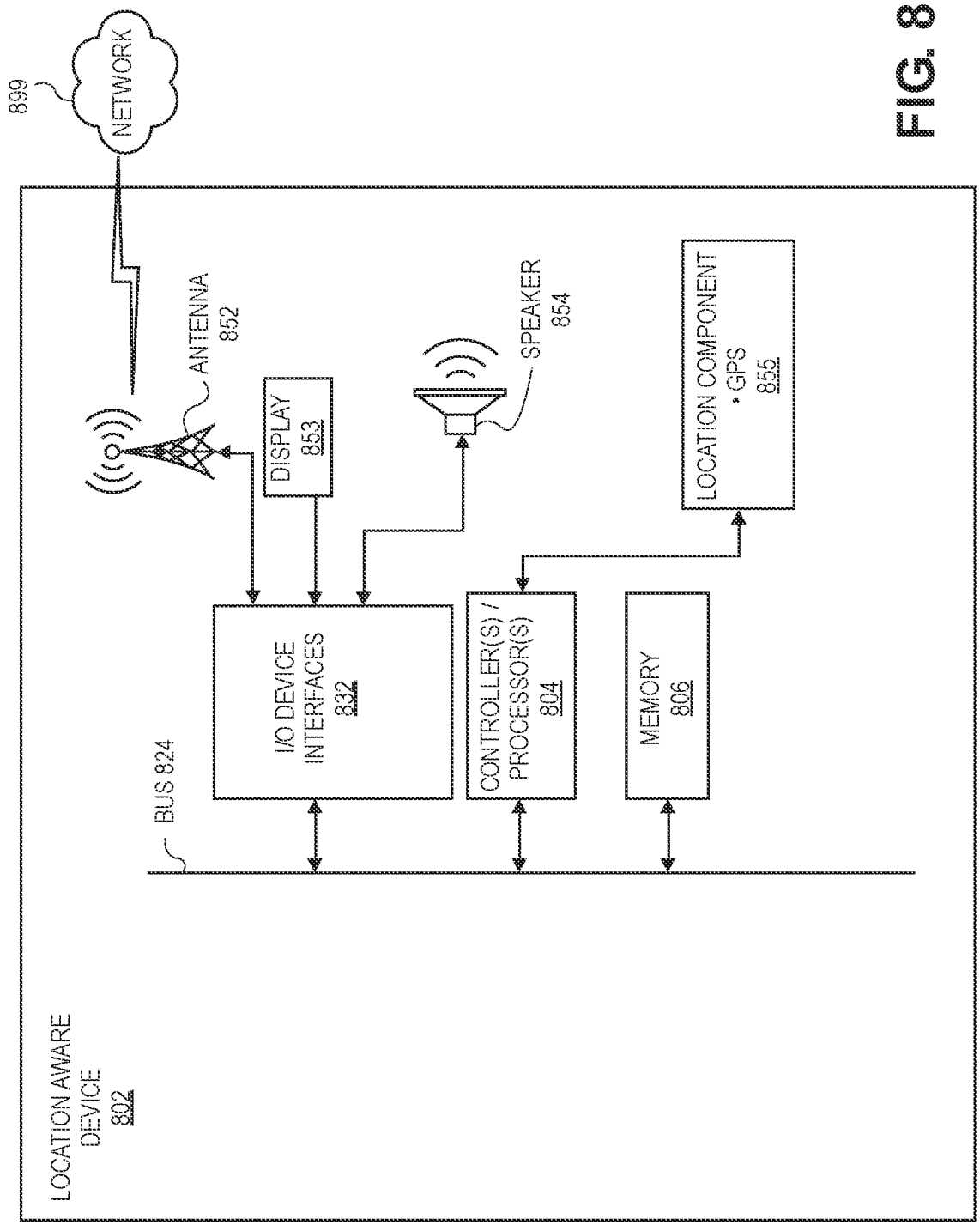
FIG. 8 illustrates example components of a location aware device, in accordance with disclosed implementations.
Figure 9:
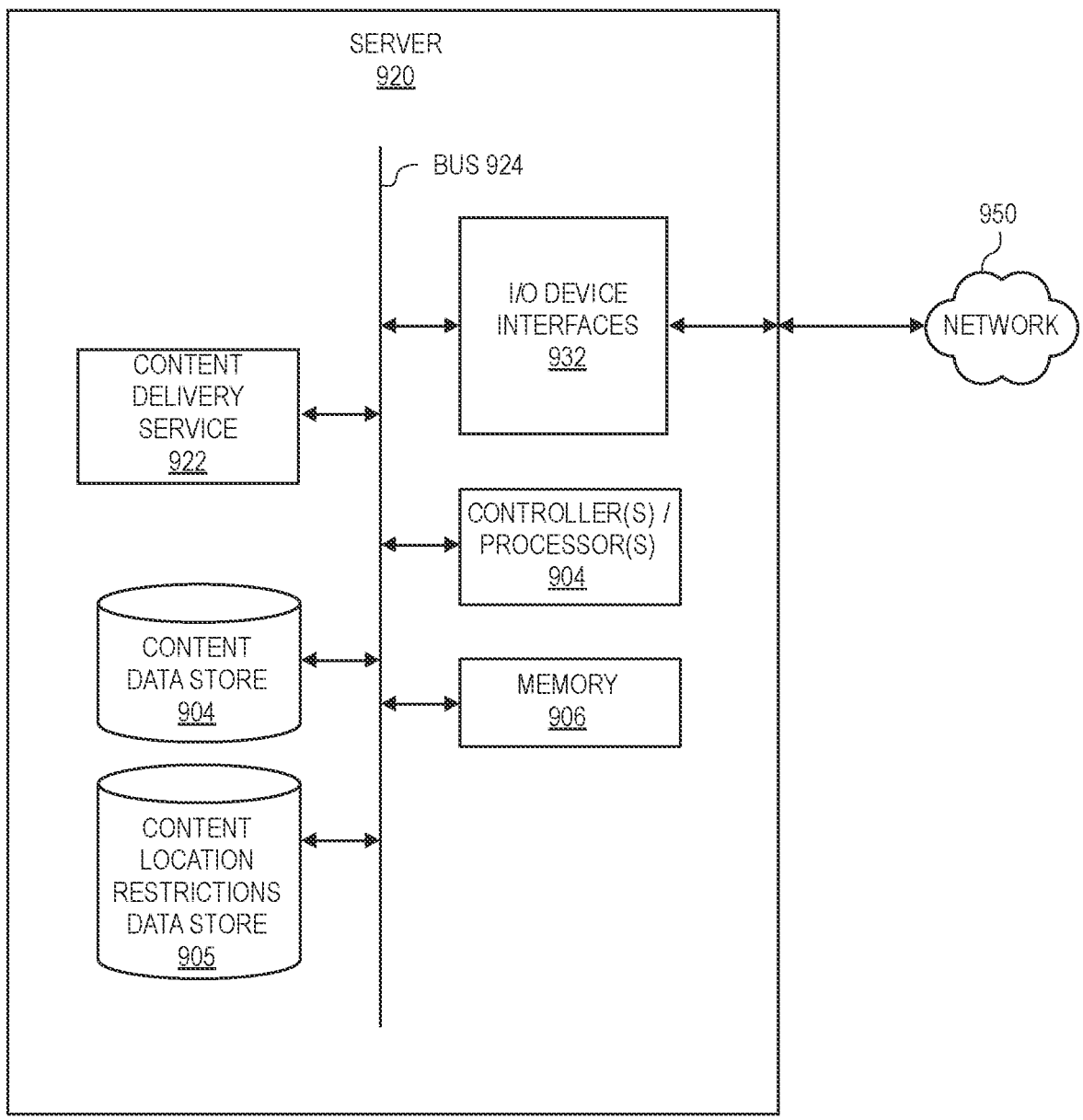
FIG. 9 illustrates example components of a server, in accordance with disclosed implementations.

FIG. 7 is a block diagram conceptually illustrating a non-location aware device 702 that may be used with the described implementations. FIG. 8 is a block diagram conceptually illustrating a location aware device 802 that may be used with the described implementations. FIG. 9 is a block diagram conceptually illustrating example components of a remote computing device, such as a remote server 920 that may be used with the described implementations. Multiple such servers 920 may be included in the system. In operation, each of these devices (or groups of devices) may include computer-readable and computer-executable instructions that reside on the respective device (702/802/920), as will be discussed further below.

Each of these devices (702/802/920) may include one or more controllers/processors (704/804/904), that may each include a central processing unit (CPU) for processing data and computer-readable instructions, and a memory (706/806/906) for storing data and instructions of the respective device. The memories (706/806/906) may individually include volatile random-access memory (RAM), non-volatile read only memory (ROM), non-volatile magnetoresistive random-access memory (MRAM) and/or other types of memory. Each device may also include a data storage component (708/808/908), for storing data, controller/processor-executable instructions, etc. Likewise, the server 920 may include, or be operable to access a content data store 904, and/or content location restrictions data store 905. Each data storage component and/or data store may individually include one or more non-volatile storage types such as magnetic storage, optical storage, solid-state storage, etc. Each device may also be connected to removable or external non-volatile memory and/or storage (such as a removable memory card, memory key drive, networked storage, etc.) through respective input/output device interfaces (732/832/932).

Computer instructions for operating each device (702/802/920) and its various components may be executed by the respective device's controller(s)/processor(s) (704/804/904), using the memory (706/806/906) as temporary "working" storage at runtime. A device's computer instructions may be stored in a non-transitory manner in non-volatile memory (706/806/906), storage (708/808/908), or an external device(s). Alternatively, some or all of the executable instructions may be embedded in hardware or firmware on the respective device in addition to, or instead of software.

Each device (702/802/920) includes input/output device interfaces (732/832/932). A variety of components may be connected through the input/output device interfaces. Additionally, each device (702/802/920) may include an address/data bus (724/824/924) for conveying data among components of the respective device. Each component within a device (702/802/920) may also be directly connected to other components in addition to (or instead of) being connected to other components across the bus (724/824/924).

Referring to the non-location aware device 702 of FIG. 7, the non-location aware device 702 may be any type of playback device, such as a television, laptop, tablet, etc., and may include a display 753, one or more speakers 754, and/or other input/output device components. For example, the included input/output device interfaces 732 may connect to a variety of components such as an audio output component such as the speaker 754, a wired headset or a wireless headset, and/or other components capable of outputting audio. The non-location aware device 702 may also include an audio capture component. The audio capture component may be, for example, a microphone or array of microphones, a wired headset, or a wireless headset, etc.

The non-location aware device 702 may also include a communication interface, such as an antenna 752. Any form of wired and/or wireless communication may be utilized to facilitate communication between the non-location aware device 702, other devices, and/or the LAN to which the non-location aware device 702 is connected. For example, any one or more of 802.15.4 (ZIGBEE), 802.11 (WI-FI), 802.16 (WiMAX), BLUETOOTH, Z-WAVE, near field communication ("NFC"), cellular, CAT6, etc., may be used to enable communication to and from the non-location aware device 702. For example, via the antenna(s) 752, the input/output device interfaces 732 may connect to one or more networks 799/899/950 via a wireless local area network (WLAN), (such as Wi-Fi) radio, Bluetooth, and/or wireless network radio, such as a radio capable of communication with a wireless communication network, such as a Long-Term Evolution (LTE) network, WiMAX network, 5G network, etc. A wired connection such as Ethernet may also be supported.

The main difference between the non-location aware device 702 and a location aware device 802 (FIG. 8) is that the non-location aware device 702 does not include a location component that is able to generate sufficiently reliable location information to support location-restricted streaming of content. While the non-location aware device 702 may include an antenna 752, as discussed, and may be capable of generating some location-based information, such as a Wi-Fi based location information, such information may not be sufficiently reliable to support location-restricted streaming of content.

In comparison and referring to the location aware device 802 of FIG. 8, the location aware device 802 includes a location component 855, such as a GPS component, that is operable to receive and maintain sufficiently reliable location information for the location aware device 802. As is known, such location components may maintain device location information at the operating system level such that the location information is reliable.

Like the non-location aware device 702 of FIG. 7, the location aware device 802 of FIG. 8 may include a display 853, one or more speakers 854, and/or other input/output components. In other implementations, the location aware device may not include any form of display and/or speakers and may serve a primary or secondary function of providing location-based information, such as access tokens discussed herein, to other devices that are connected to a same local area network as the location aware device 802. Accordingly, the location aware device 802 may be any device that is able to connect to the LAN and includes a location component 855 that may be utilized to generate location information that is sufficiently reliable for use determining a location of the device.

The location aware device 802 may also include a communication interface, such as an antenna 852. Any form of wired and/or wireless communication may be utilized to facilitate communication between the location aware device 802, the LAN, and/or other devices, such as the non-location aware device 702. For example, any one or more of 802.15.4 (ZIGBEE), 802.11 (WI-FI), 802.16 (WiMAX), BLUETOOTH, Z-WAVE, near field communication ("NFC"), cellular, CAT6, etc., may be used to enable communication to and from the location aware device 802. For example, via the antenna(s) 852, the input/output device interfaces 832 may connect to one or more networks 799/899/950 via a wireless local area network (WLAN), (such as Wi-Fi) radio, Bluetooth, and/or wireless network radio, such as a radio capable of communication with a wireless communication network, such as a Long-Term Evolution (LTE) network, WiMAX network, 5G network, etc. A wired connection such as Ethernet may also be supported.

Referring to FIG. 9, the server may also include a content delivery service 922 that provides requested content to other devices, such as non-location aware devices 702 and/or location aware devices 802. Likewise, the content delivery service 922 may also generate, provide, and verify access tokens, as discussed herein. Because the access tokens are only encrypted/decrypted by the content delivery service, keys do not need to be shared, the access tokens may be signed by the content delivery service, and encrypted/decrypted with a single private key, also known as symmetric encryption.

The content data store 904 may include content, such as media files (e.g., audio and/or video) that may be streamed to other devices, such as non-location aware devices 702 and location aware devices 802. Likewise, a content location restrictions data store 905 may also be maintained and accessed by the content delivery service 922 executing on the server 920. The content location restrictions data store 905 may include location restriction information for some, or all of the content maintained in the content data store 904, and/or content received by the content delivery service 922. The content location restrictions may indicate defined areas or locations in which the content may be streamed and presented. In some implementations, the content location restrictions maintained in the content location restrictions data store 905 may include zip codes, geo-fencing, area codes, and/or other geographic descriptors that may be used to restrict streaming or delivery of content to different devices based on the geographic descriptors.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, communications, media files, and machine learning should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some, or all of the specific details and steps disclosed herein.

Moreover, with respect to the one or more methods or processes of the present disclosure shown or described herein, including but not limited to the transition diagrams and flow charts shown in FIGS. 1A through 6, orders in which such methods or processes are presented are not intended to be construed as any limitation on the claims, and any number of the method or process steps or boxes described herein can be combined in any order and/or in parallel to implement the methods or processes described herein. In addition, some process steps or boxes may be optional. Also, the drawings herein are not drawn to scale.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk, and/or other media. In addition, components of one or more of the modules and engines may be implemented in firmware or hardware.

Disjunctive language such as the phrase "at least one of X, Y, or Z," or "at least one of X, Y and Z," unless specifically stated otherwise, is otherwise understood with the context as used in general to present that an item, term, etc., may be any of X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" or "a device operable to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

Although the invention has been described and illustrated with respect to illustrative implementations thereof, the foregoing and various other additions and omissions may be made therein and thereto without departing from the spirit and scope of the present disclosure.

What is claimed is:

1. A system, comprising:
    a content delivery service that is remote from a local area network and connected to the local area network through a public network, the content delivery service operable to at least:
        receive, from a location aware device, a first location information of the location aware device within a first defined area;
        generate an access token associated with the first defined area based at least in part on the first location information;
        send, to the location aware device, the access token;
        receive, from a non-location aware device, a request for location restricted content and the access token, wherein the location restricted content is location restricted such that delivery of the location restricted content by the content delivery service is enabled for the first defined area and disabled for a second defined area that is different than the first defined area;
        determine, based at least in part on the access token received from the non-location aware device, that the non-location aware device is within the first defined area; and
        in response to a determination that the non-location aware device is within the first defined area, send the location restricted content to the non-location aware device;
    the location aware device connected to the local area network, the location aware device including:
        a location component operable to generate the first location information;
        a first processor; and
        a first memory storing a first program instructions that, when executed by the first processor, cause the first processor to at least:
            obtain, from the location component, the first location information;
            send, to the content delivery service, the first location information;
            receive, from the content delivery service, the access token; and
            provide, to the non-location aware device connected to the local area network, the access token; and
    the non-location aware device connected to the local area network, the non-location aware device including:
        a second processor; and a second memory storing a second program instructions that, when executed by the second processor, cause the second processor to at least:
  receive, from the location aware device and via the local area network, the access token;
  send, to the content delivery service, the access token and the request for the location restricted content;
  receive, from the content delivery service and in response to verification by the content delivery service that the non-location aware device is within the first defined area, the location restricted content; and
  present the location restricted content.

2. The system of claim 1, wherein the content delivery service is further configured to at least:
  encrypt the first location information to form an encrypted location token; and
  wherein:
    the encrypted location token is included in the access token; and
    the encrypted location token cannot be decrypted by the location aware device or the non-location aware device.

3. The system of claim 2, wherein the content delivery service is further configured to at least:
  generate a time to live ("TTL") indicative of a time duration for which the access token is valid; and
  include the TTL in the access token.

4. The system of claim 3, wherein the content delivery service is further configured to at least:
  determine, based at least in part on the TTL included in the access token, that the access token is valid.

5. The system of claim 1, wherein the second program instructions, when executed by the second processor, further cause the second processor to at least:
  send, via the local area network, a message requesting the access token.

6. The system of claim 1, wherein:
  the second program instructions, when executed by the second processor, further cause the second processor to at least:
    receive, from a second location aware device and via the local area network, a second access token; and
    send, to the content delivery service, the access token, the second access token, and the request for the location restricted content; and
  the content delivery service is further configured to at least:
    determine, based at least in part on the access token and the second access token received from the non-location aware device, that the non-location aware device is within the first defined area.

7. A computer-implemented method, comprising:
  receiving, at a content delivery service and from a first device that is remote from the content delivery service, a first location information indicative of a location of the first device within a first defined area;
  generating, at the content delivery service and based at least in part on the first location information, an access token associated with the first defined area;
  sending, from the content delivery service and to the first device, the access token;
  receiving, at the content delivery service and from a second device that is different than the first device and remote from the content delivery service, the access token and a request for a content, wherein the content is location restricted such that delivery of the content by the content delivery service is enabled for the first defined area and disabled for a second defined area that is different than the first defined area;
  determining, based at least in part on the access token received from the second device, that the second device is within the first defined area; and
  in response to determining that the second device is within the first defined area, sending the content to the second device for presentation by the second device.

8. The computer-implemented method of claim 7, wherein generating the access token, includes:
  encrypting the first location information to form an encrypted location token; and
  including the encrypted location token in the access token.

9. The computer-implemented method of claim 8, further comprising:
  generating a time to live ("TTL") for the access token;
  forming the access token to include the encrypted location token and the TTL; and
  digitally signing the access token; and
  wherein:
    the TTL is accessible to the first device and the second device; and
    the encrypted location token cannot be decrypted by the first device or the second device.

10. The computer-implemented method of claim 7, wherein generating the access token, includes:
  storing an association between the first location information and a unique identifier; and
  including the unique identifier in the access token.

11. The computer-implemented method of claim 7, further comprising:
  in response to receiving the access token and the request for content from the second device, associating the access token with the second device.

12. The computer-implemented method of claim 7, further comprising:
  receiving, at the content delivery service and from the second device, the access token and a second request for a second content, wherein the second content is location restricted such that delivery of the second content by the content delivery service is enabled for the second defined area and disabled for the first defined area;
  determining, based at least in part on the access token received from the second device, that the second device is within the first defined area; and
  in response to determining that the second device is within the first defined area, sending a notification to the second device indicating that the second content is not available for presentation.

13. The computer-implemented method of claim 7, wherein the first device and the second device are connected to a local area network.

14. The computer-implemented method of claim 7, further comprising:
  receiving, at the content delivery service and from a third device that is different than the first device, different from the second device, and remote from the content delivery service, a second location information of a second location of the third device;
  generating, at the content delivery service and based at least in part on the second location information, a second access token;
  sending, from the content delivery service and to the third device, the second access token; and wherein:
receiving, at the content delivery service and from the second device, further includes, receiving the second access token; and
determining that the second device is within the first defined area is further based at least in part on the second access token.

15. The computer-implemented method of claim 14, wherein the first device, the second device, and the third device are connected to a local area network.

16. A system, comprising:
a first device connected to a local area network;
a second device connected to the local area network; and
a content delivery service that is remote from the first device and the second device;
wherein:
the first device is configured to at least:
store an access token that is generated based at least in part on a location information indicating a location of the first device within a defined area; and
send, via the local area network, the access token associated with the defined area to the second device;
the second device is configured to at least:
send the access token and a request for a content to the content delivery service;
receive, from the content delivery service, the content; and
present the content; and
the content delivery service is configured to at least:
receive, from the second device, the access token and the request for the content;
verify, based at least in part on the access token, that the second device is within the defined area; and
in response to verification that the second device is within the defined area, send the content to the second device.

17. The system of claim 16, wherein:
the first device is further configured to at least send the location information to the content delivery service; and
the content delivery service is further configured to at least:
generate the access token; and
send the access token to the first device.

18. The system of claim 16, wherein:
the second device is further configured to at least send a second request for the access token; and
the first device sends the access token in response to the second request.

19. The system of claim 16, wherein:
the first device includes a location component that generates the location information; and
the second device does not include any location component.

20. The system of claim 19, wherein the location component is a Global Positioning System ("GPS") component.

* * * * *